(12) United States Patent
Ellenbogen et al.

(10) Patent No.: US 11,137,617 B2
(45) Date of Patent: Oct. 5, 2021

(54) SYSTEM AND METHOD FOR CONTROLLING LIGHT BY AN ARRAY OF OPTICAL RESONATORS

(71) Applicant: Technology Innovation Momentum Fund (Israel) Limited Partnership, Tel-Aviv (IL)

(72) Inventors: Tal Ellenbogen, Tel-Aviv (IL); Omri Eisenbach, Tel-Aviv (IL); Ori Avayu, Tel Aviv (IL); Ran Ditcovski, Moshav Mazor (IL)

(73) Assignee: Technology Innovation Momentum Fund (Israel) Limited Partnership, Tel-Aviv (IL)

( * ) Notice: Subject to any disclaimer, the term of this patent is extended or adjusted under 35 U.S.C. 154(b) by 233 days.

(21) Appl. No.: 16/406,045

(22) Filed: May 8, 2019

(65) Prior Publication Data
US 2019/0265498 A1   Aug. 29, 2019

Related U.S. Application Data

(62) Division of application No. 15/032,418, filed as application No. PCT/IL2014/050932 on Oct. 28, 2014, now Pat. No. 10,310,287.
(Continued)

(51) Int. Cl.
*G02B 5/30* (2006.01)
*G02B 27/42* (2006.01)
(Continued)

(52) U.S. Cl.
CPC ........ *G02B 27/4211* (2013.01); *G02B 1/002* (2013.01); *G02B 5/008* (2013.01);
(Continued)

(58) Field of Classification Search
CPC .......... G02B 1/00; G02B 1/002; G02B 1/005; G02B 1/007; G02B 3/00; G02B 3/0006;
(Continued)

(56) References Cited

U.S. PATENT DOCUMENTS

| 2005/0073744 A1 | 4/2005 | Zheludev et al. |
| 2007/0014006 A1* | 1/2007 | Tanaka ............. G02F 1/0136 359/485.02 |

(Continued)

FOREIGN PATENT DOCUMENTS

| EP | 1128197 | 8/2001 |
| JP | 2006350232 A * | 12/2006 ........... G02F 1/0136 |

(Continued)

OTHER PUBLICATIONS

Communication Pursuant to Rule 164(1) EPC [Supplementary Partial European Search Report and the Provisional Opinion] dated Jun. 30, 2017 From the European Patent Office Re. Application No. 14857816.4. (12 Pages).
(Continued)

*Primary Examiner* — Arnel C Lavarias

(57) ABSTRACT

An array of optical resonators comprises at least a first type of optical resonators each having a resonant response to an optical field at a first wavelength, and a second type of optical resonators each having a resonant response to an optical field at a second wavelength, being different from the first wavelength. The resonant responses can be selected to reduce chromatic aberrations, or to shape a profile of a light beam, or to selectively switch a near field beam.

19 Claims, 28 Drawing Sheets
(25 of 28 Drawing Sheet(s) Filed in Color)

Related U.S. Application Data

(60) Provisional application No. 61/896,190, filed on Oct. 28, 2013.

(51) Int. Cl.
  *G02B 1/00* (2006.01)
  *G02B 5/00* (2006.01)
  *B82Y 20/00* (2011.01)

(52) U.S. Cl.
  CPC ........... *G02B 5/30* (2013.01); *G02B 27/4261* (2013.01); *B82Y 20/00* (2013.01)

(58) Field of Classification Search
  CPC ...... G02B 5/18; G02B 5/1809; G02B 5/1814; G02B 5/1819; G02B 5/1823; G02B 5/1876; G02B 5/188; G02B 5/1885; G02B 5/189; G02B 5/1895; G02B 5/30; G02B 5/3025; G02B 27/0025; G02B 27/0037; G02B 27/005; G02B 27/0056; G02B 27/0062; G02B 27/28; G02B 27/42; G02B 27/4205; G02B 27/4211
  USPC .... 359/486.01, 486.02, 486.03, 490.01, 558, 359/565, 566, 569, 576, 6, 42, 721, 724, 359/741, 742
  See application file for complete search history.

(56) References Cited

U.S. PATENT DOCUMENTS

| | | | |
|---|---|---|---|
| 2008/0088524 A1 | 4/2008 | Wang et al. | |
| 2008/0089645 A1 | 4/2008 | Wang et al. | |
| 2008/0198453 A1* | 8/2008 | LaFontaine | G02B 5/3075 359/485.01 |
| 2009/0296236 A1* | 12/2009 | Bowers | G02B 27/40 359/721 |
| 2010/0054105 A1* | 3/2010 | Handa | B82Y 20/00 369/112.01 |
| 2010/0141358 A1* | 6/2010 | Akyurtlu | H01P 1/20 333/219.1 |
| 2012/0113502 A1 | 5/2012 | Suh et al. | |
| 2013/0077049 A1 | 3/2013 | Bohn | |
| 2013/0208332 A1* | 8/2013 | Yu | G02B 1/002 359/240 |
| 2016/0259175 A1 | 9/2016 | Ellenbogen et al. | |
| 2016/0306079 A1 | 10/2016 | Arbabi et al. | |
| 2017/0131460 A1 | 5/2017 | Lin et al. | |
| 2017/0293141 A1 | 10/2017 | Schowengerdt et al. | |
| 2017/0310907 A1 | 10/2017 | Wang | |
| 2018/0217395 A1 | 8/2018 | Lin et al. | |
| 2018/0252857 A1 | 9/2018 | Glik et al. | |
| 2020/0284960 A1 | 9/2020 | Ellenbogen et al. | |
| 2021/0181515 A1 | 6/2021 | Ellenbogen et al. | |

FOREIGN PATENT DOCUMENTS

| | | |
|---|---|---|
| WO | WO 2005/057247 | 6/2005 |
| WO | WO 2011/139785 | 11/2011 |
| WO | WO 2013/033591 | 3/2013 |
| WO | WO 2013/033591 | 5/2013 |
| WO | WO 2015/063762 | 5/2015 |
| WO | WO 2018/142339 | 8/2018 |
| WO | WO 2020/065380 | 4/2020 |

OTHER PUBLICATIONS

Corrected Supplementary European Search Report and the European Search Opinion dated Jan. 16, 2018 From the European Patent Office Re. Application No. 14857816.4. (12 Pages).
International Preliminary Report on Patentability dated May 12, 2016 From the International Bureau of WIPO Re. Application No. PCT/IL2014/050932.
International Search Report and the Written Opinion dated May 3, 2018 From the International Searching Authority Re. Application No. PCT/IB2018/050668. (11 Pages).
International Search Report and the Written Opinion dated Feb. 17, 2015 From the International Searching Authority Re. Application No. PCT/IL2014/050932.
International Search Report and the Written Opinion dated Jan. 24, 2019 From the International Searching Authority Re. Application No. PCT/IB2018/057504. (14 Pages).
Official Action dated May 14, 2018 From the US Patent and Trademark Office Re. U.S. Appl. No. 15/032,418. (19 pages).
Supplementary European Search Report and the European Search Opinion dated Sep. 11, 2017 From the European Patent Office Re. Application No. 14857816.4. (16 Pages).
Aieta et al. "Aberration-Free Ultrathin Flat Lenses and Axicons at Telecom Wavelengths Based on Plasmonic Metasurfaces", Nano Letters, 12: 4932-4936, Aug. 15, 2012.
Avayu et al. "Ultrathin Full Color Visor With Large Field of View Based on Multilayered Metasurface Design", Digital Optics for Immersive Displays, Proceedings of the SPIE, 1067612: 1067612-1-1067612-7, May 21, 2018.
Chen et al. "Dual-Polarity Plasmonic Metalens for Visible Light", Nature Communications, 3: 1198-1-1198-6, Nov. 13, 2012.
Ellenbogen et al. "Nonlinear Generation and Manipulation of Airy Beams", Nature Photonics, 3: 395-398, Jul. 2009.
Fu et al. "Experimental Investigation of Superfocusing of Plasmonic Lens With Chirped Circular Nanoslits", Optics Express, 18(4): 3438-3443, Feb. 15, 2010.
Giannini et al. "Plasmonic Nanoantennas: Fundamentals and Their Use in Controlling the Radiative Properties of Nanoemitters", Chemical Reviews, 111(6): 3888-3912, Mar. 24, 2011.
Lin et al. "Polarization-Controlled Tunable Directional Coupling of Surface Plasmon Polaritons", Science 340: 331-334, Apr. 19, 2013.
Liu et al. "Three-Dimensional Photonic Metamaterials at Optical Frequencies", Nature Materials, 7(1): 31-37, Published Online Dec. 2, 2007.
Siviloglou et al. "Accelerating Finite Energy Airy Beams", Optics Letters, 32(8): 979-981, Apr. 15, 2007.
Wan et al. "Control the Dispersive Properties of Compound Plasmonic Lenses", Optics Communicationa, XP055384689, 291: 390-394, Available Online Dec. 5, 2012. Section 3, Figs.1-4.
Young "Zone Plates and Their Aberrations", Journal of the Optical Society of America, 62(8): 972-976, Aug. 1972.
Zhao et al. "A Reconfigurable Plasmofluidic Lens", Nature Communications, 4(2305): 1-8, Aug. 9, 2013.

* cited by examiner

FIG. 2
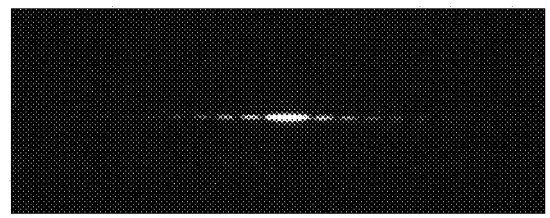
FIG. 3A
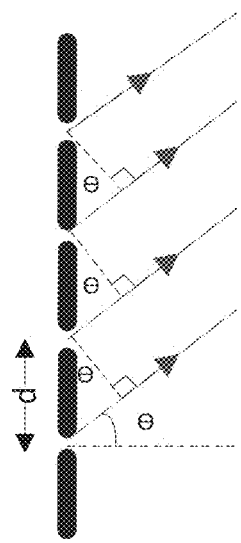
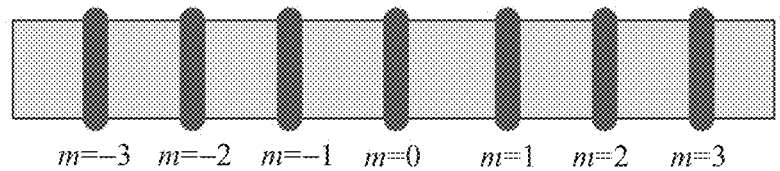
FIG. 3B

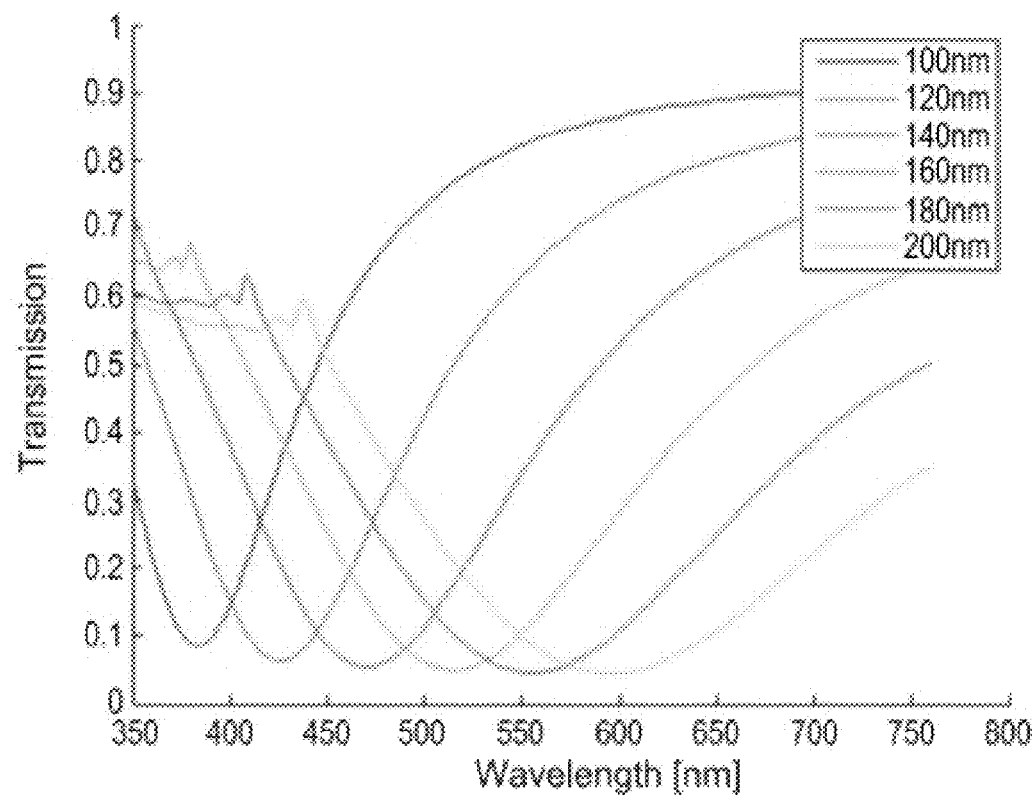
FIG. 9
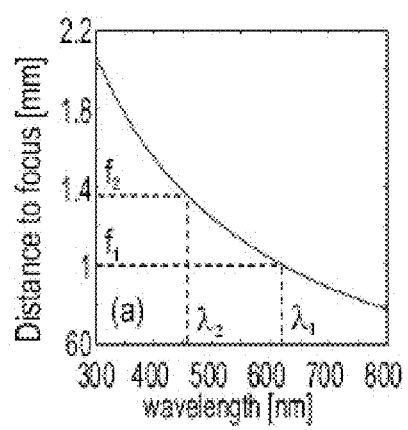 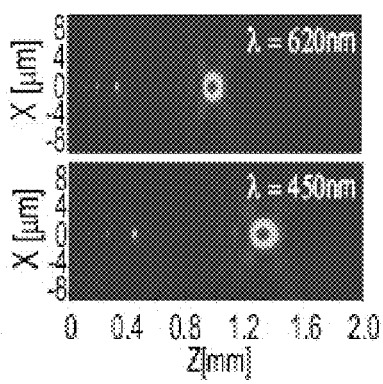 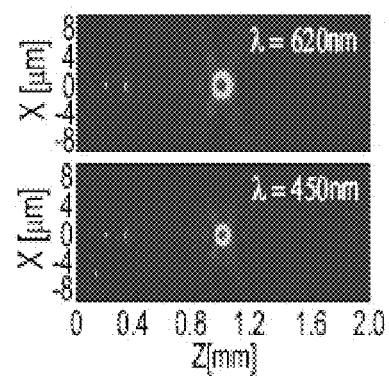
FIG. 10A　　　　FIG. 10B　　　　FIG. 10C

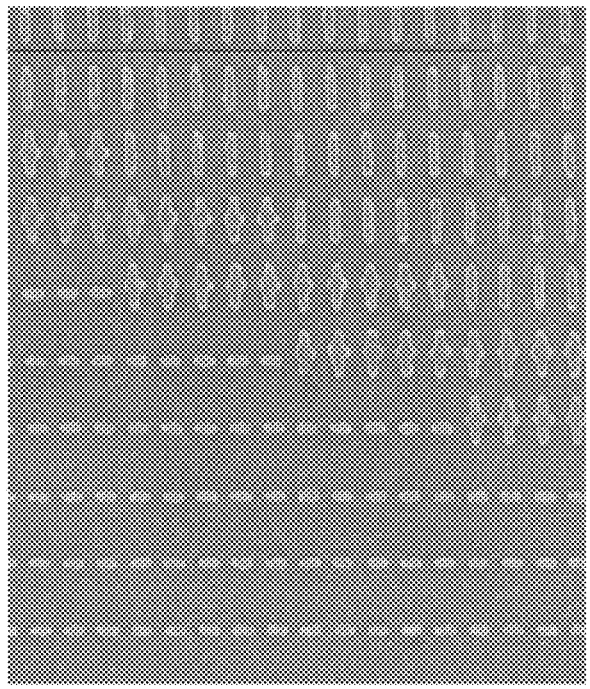 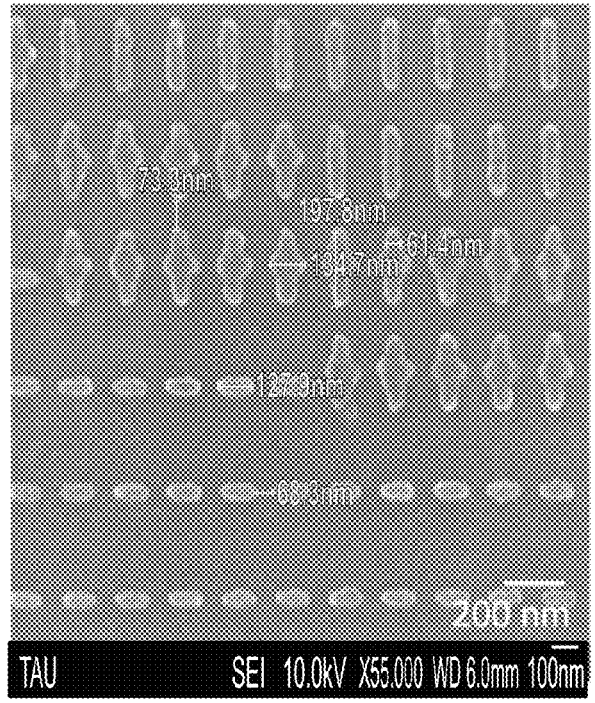
FIG. 14A  FIG. 14B
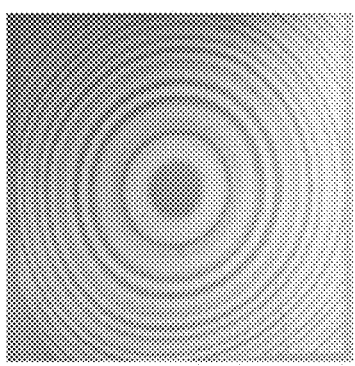 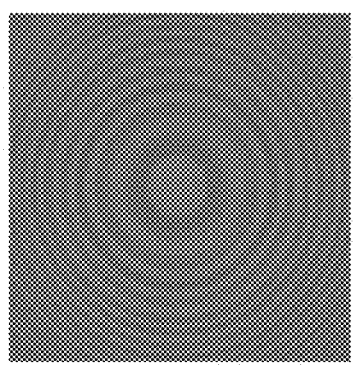 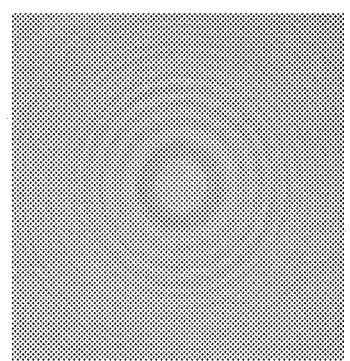
FIG. 15A  FIG. 15B  FIG. 15C Polarity 0

Polarity 45

Polarity 90

FIG. 22A
FIG. 22B
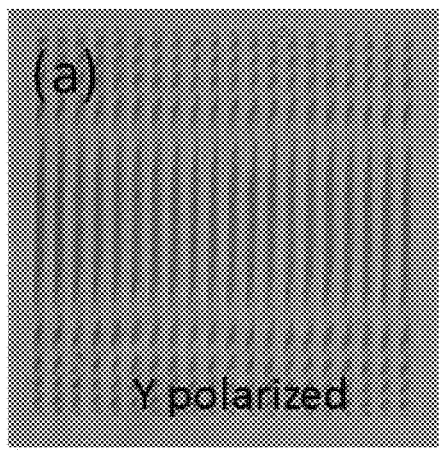
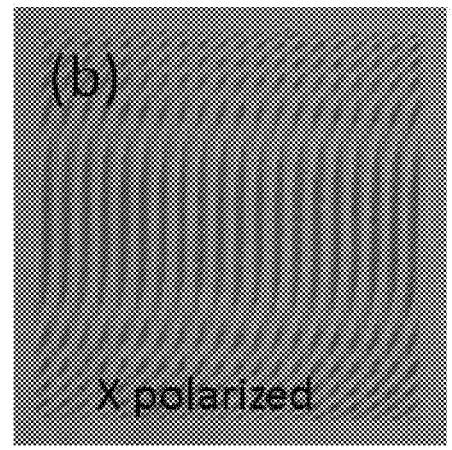
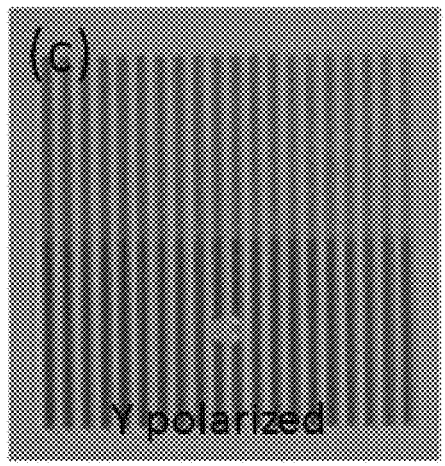
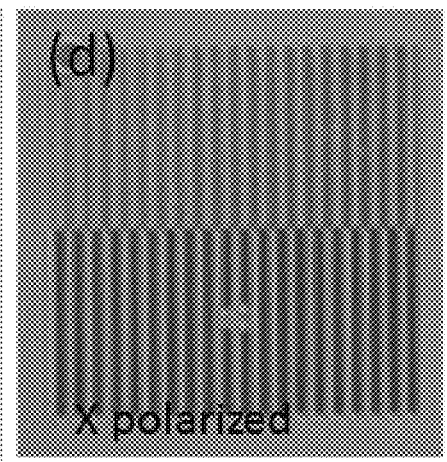
FIG. 22C
FIG. 22D

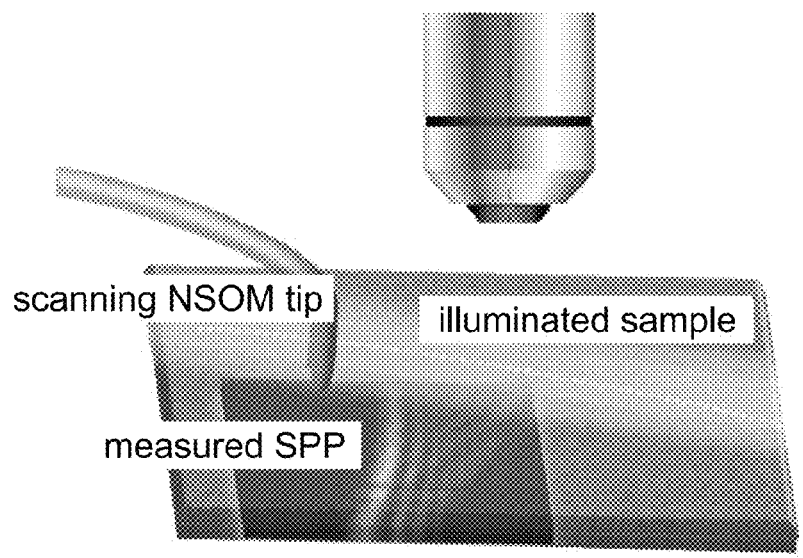
FIG. 24A
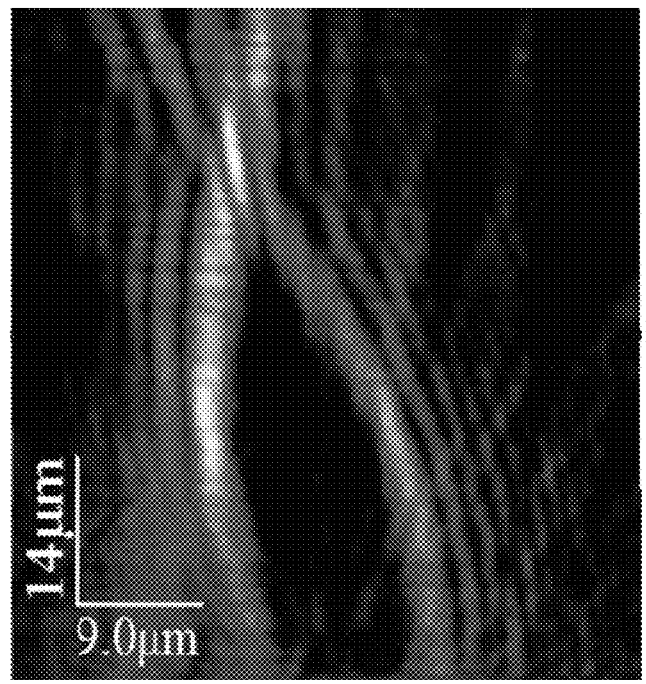
FIG. 24B
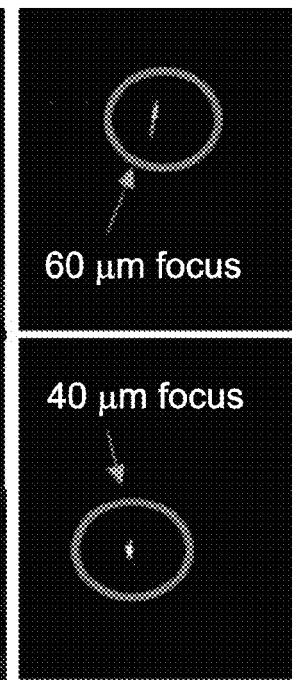
FIG. 24C
FIG. 24D

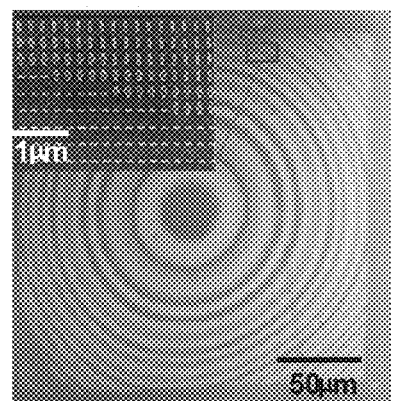
FIG. 27
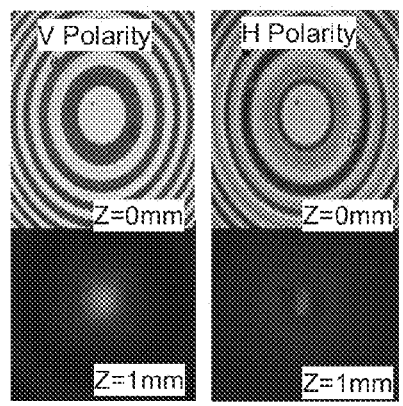
FIG. 28A  FIG. 28B
FIG. 28C  FIG. 28D
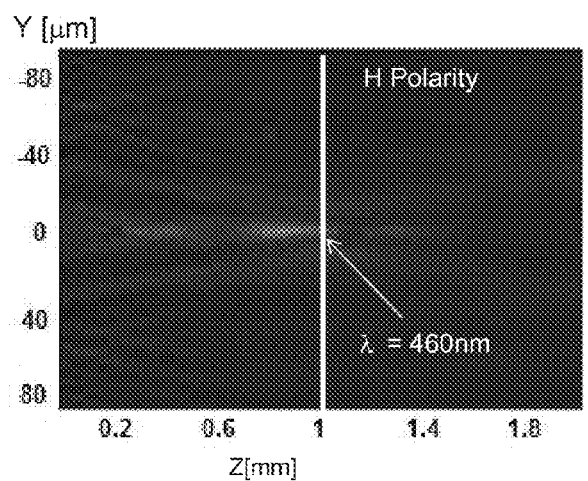
FIG. 29A
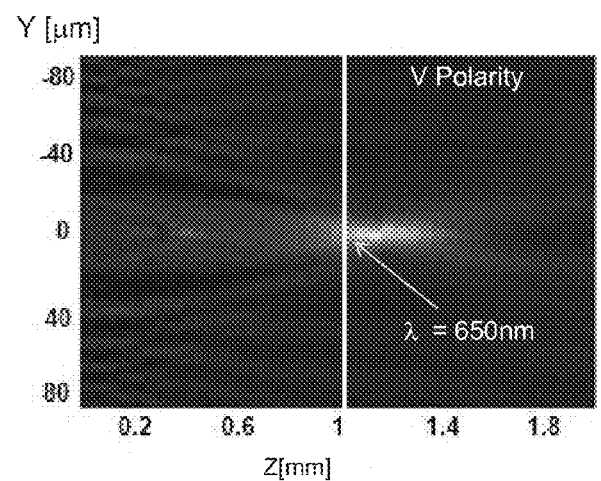
FIG. 29B

SYSTEM AND METHOD FOR CONTROLLING LIGHT BY AN ARRAY OF OPTICAL RESONATORS

RELATED APPLICATIONS

This application is a division of U.S. patent application Ser. No. 15/032,418 filed on Apr. 27, 2016, which is a national phase of PCT Patent Application No. PCT/IL2014/050932 having International Filing Date of Oct. 28, 2014, which claims the benefit of priority under 35 USC § 119(e) of U.S. Provisional Patent Application No. 61/896,190 filed on Oct. 28, 2013, the contents of which are incorporated herein by reference in their entirety.

FIELD AND BACKGROUND OF THE INVENTION

The present invention, in some embodiments thereof, relates to optics and, more particularly, but not exclusively, to a system and method for controlling light.

A light wavefront can be shaped by optical components, such as lenses and prisms, as well as diffractive elements, such as gratings and holograms, relying on gradual phase changes accumulated along the optical path.

Known in the art is the use of flat optical components which exploit the wave diffraction phenomenon and create engineered diffractive optical elements made out of amplitude and phase plates. Recently there were some demonstrations of control and diversion of light field by using metasurfaces.

Aieta, et al., Nano Letters 12, 4932 (2012), apply optical phase discontinuities to the design of a phased array of ultrathin subwavelength-spaced optical antennas. V-shaped nanoantennas introduce a radial distribution of phase discontinuities, thereby generating respectively spherical wavefronts and non-diffracting Bessel beams at telecom wavelengths.

Chen et al., Nature Communications 3, 1198 (2012), teach a dual-polarity flat lens based on helicity-dependent phase discontinuities for circularly polarized light. By controlling the helicity of the input light, the positive and negative polarities are interchangeable in one identical flat lens. Helicity controllable real and virtual focal planes, as well as magnified and demagnified imaging, are observed on the same plasmonic lens at visible and near-infrared wavelengths.

Fu et al., Optics Express 18, 3438 (2010), teach a plasmonic lens with metallic chirped circular nanoslits corrugated on Au film supported on quartz substrate for the purpose of super-focusing. An improved focusing performance in comparison to that of the non-chirped lens is reported.

Ellenbogen et al., Nano Letters 12, 1026 (2012), teach nonlinear generation of Airy beams using wave mixing processes, which occur in asymmetric nonlinear photonic crystals.

SUMMARY OF THE INVENTION

According to an aspect of some embodiments of the present invention there is provided an optical system. The system comprises a refractive optical element, and an array of optical resonators. The refractive optical element and the array are positioned on the same optical axis, wherein the array of optical resonators comprises at least a first type of optical resonators each having a resonant response to an optical field at a first wavelength, and a second type of optical resonators each having a resonant response to an optical field at a second wavelength, being different from the first wavelength. The resonant responses are selected to reduce chromatic aberrations associated with the refractive optical element.

According to some embodiments of the invention at least one optical resonator of the first type is laterally displaced from any optical resonator of the second type, and at least one optical resonator of the first type partially overlaps with at least one optical resonator of the second type.

According to an aspect of some embodiments of the present invention there is provided an optical system. The system comprises an array of optical resonators, wherein the array of optical resonators comprises at least a first type of optical resonators each having a resonant response to an optical field at a first wavelength, and a second type of optical resonators each having a resonant response to an optical field at a second wavelength, being different from the first wavelength. In some embodiments of the present invention at least one optical resonator of the first type is laterally displaced from any optical resonator of the second type, and at least one optical resonator of the first type partially overlaps with at least one optical resonator of the second type.

According to some embodiments of the invention the array of optical resonators is configured to focus both the first and the second wavelengths generally onto the same focal plane.

According to some embodiments of the invention the first type of optical resonators has a resonant response to an optical field at a first polarization, and the second type of optical resonators has resonant response to an optical field at a second polarization, being different from the first polarization.

According to some embodiments of the invention the invention the system comprises a polarizer constituted to polarize an optical field prior to an incident of the optical field on the array of optical resonators.

According to some embodiments of the invention the array of optical resonators is configured to focus: (i) an optical field having the first wavelength and the first polarization at a focal plane; and (ii) an optical field having the second wavelength and the second polarization, onto the same focal plane.

According to some embodiments of the invention the array of optical resonators is configured to focus the first polarization onto a first focal plane, and the second polarization onto a second focal plane, being different from the first plane.

According to some embodiments of the invention the array of optical resonators is configured to provide a polarization-dependent beam profile.

According to some embodiments of the invention the array of optical resonators is configured to provide a wavelength-dependent beam profile.

According to some embodiments of the invention the array of optical resonators is configured to focus white light at a single focal plane.

According to some embodiments of the invention the system comprises at least one additional array of optical resonators, wherein the array and the at least one additional array engage different surfaces.

According to some embodiments of the invention the array and the additional array are planar.

According to some embodiments of the invention the array of optical resonators is planar.

According to some embodiments of the invention the system comprises a substrate carrying the array of optical resonators.

According to some embodiments of the invention the substrate is generally rigid.

According to some embodiments of the invention the substrate is flexible.

According to some embodiments of the invention the array of optical resonators is deposited or printed on a refractive surface of the refractive optical element.

According to some embodiments of the invention the resonant response comprises plasmonic excitation.

According to some embodiments of the invention at least some of the optical resonators are elongated nanostructures.

According to some embodiments of the invention at least some of the optical resonators are nanoantennas.

According to some embodiments of the invention at least some of the optical resonators are selected from the group consisting of resonant cavities, nano-apertures and quantum confinement structures.

According to some embodiments of the invention the system is configured for providing diffraction in reflective mode.

According to some embodiments of the invention the system is configured for providing diffraction in transmissive mode.

According to an aspect of some embodiments of the present invention there is provided an optical system. The system comprises an array of nanoresonators, wherein the array of elongated nanoresonators is spatially ordered to polarize or effect light polarization over a cross section of the light beam, or an image, for at least one wavelength.

According to an aspect of some embodiments of the present invention there is provided an optical system. The system comprises an array of elongated nanostructures, wherein the array of elongated nanostructures is spatially ordered to polarize or effect light polarization over a cross section of the light beam, or an image, for any wavelength within a wavelength range spanning over at least 100 nm.

According to an aspect of some embodiments of the present invention there is provided an optical system. The system comprises spatially dependent polarizers, wherein the spatially dependent polarizers are configured for selectively polarizing a section of an image at the image plane or Fourier plane.

According to an aspect of some embodiments of the present invention there is provided an optical system. The system comprises a refractive optical element, and an array of elongated nanostructures, wherein the refractive optical element and the array are positioned on the same optical axis, and wherein the array of elongated nanostructures is selected to effect a spatially varying polarization over a cross section of the light beam, for any wavelength within a wavelength range spanning over at least 100 nm.

According to some embodiments of the invention the array is positioned at or near a Fourier plane of an image.

According to an aspect of some embodiments of the present invention there is provided a lens system, which comprises the system as delineated above and optionally as further detailed below.

According to an aspect of some embodiments of the present invention there is provided a beam shaping system, which comprises the system as delineated above and optionally as further detailed below.

According to an aspect of some embodiments of the present invention there is provided an imaging system, which comprises the system as delineated above and optionally as further detailed below.

According to an aspect of some embodiments of the present invention there is provided an optical sensor system, which comprises the system as delineated above and optionally as further detailed below.

According to an aspect of some embodiments of the present invention there is provided a method of controlling light, which comprises the system as delineated above and optionally as further detailed below.

According to some embodiments of the invention the method is executed to reduce longitudinal chromatic aberrations.

According to some embodiments of the invention the method is executed to reduce transverse chromatic aberrations.

According to some embodiments of the invention the method is executed to reshape a profile of the light beam.

According to some embodiments of the invention the method is executed to shape a profile of a near field beam.

According to some embodiments of the invention the method is executed to selectively switch a near field beam.

According to some embodiments of the invention the method is executed for hyper spectral imaging.

According to some embodiments of the invention the method is executed for spectroscopy.

According to some embodiments of the invention the method is executed for obtaining spatial spectral dependence of the sample or image.

According to some embodiments of the invention the method is executed for filtering spatial frequencies of the image.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A and 1B illustrate a plane wave incident upon a small slit with a width size a and a viewing screen at distance D.

FIG. 2 is representative example of an image of a diffractive pattern obtained using a single slit.

FIGS. 3A and 3B are schematic illustrations of a linear grating and the obtained diffraction patterns.

FIG. 4 is a schematic illustration of a representative example of a binary diffractive lens having n ring zones.

FIG. 5 is an illustration showing a side view of an optical system, according to some embodiments of the present invention.

FIGS. 6A and 6B are schematic illustrations of diffraction gratings according to some embodiments of the present invention for X polarization (FIG. 6A) and Y polarization (FIG. 6B).

FIG. 6C is a schematic illustration showing resonators combined to form a single grating.

FIG. 7 is a schematic illustration of an array of polarizers in embodiment of the present invention in which made non-resonant polarizers are employed.

FIG. 8A is a schematic illustration of a conventional FZP lens.

FIG. 8B is a schematic illustration of an FZP lens which comprises, according to some embodiments of the present invention, an array of resonators.

FIG. 8C is a schematic illustration of an embodiment in which several different FZP lenses are positioned serially on the same optical axis.

FIG. 9 shows simulation results for transmission through an array of cross shape Aluminium nanoantennas with arm lengths ranging from 100 nm to 200 nm.

FIG. 10A shows calculated chromatic aberrations of a focal point using a conventional FZP.

FIG. 10B shows simulation results of focusing light at wavelength of 620 nm and wavelength of 450 nm through a conventional FZP which was designed to focus the light at 620 nm to 1 mm.

FIG. 10C shows calculated results of the focusing properties of an FZP lens of some embodiments of the present invention.

Figure 11A:
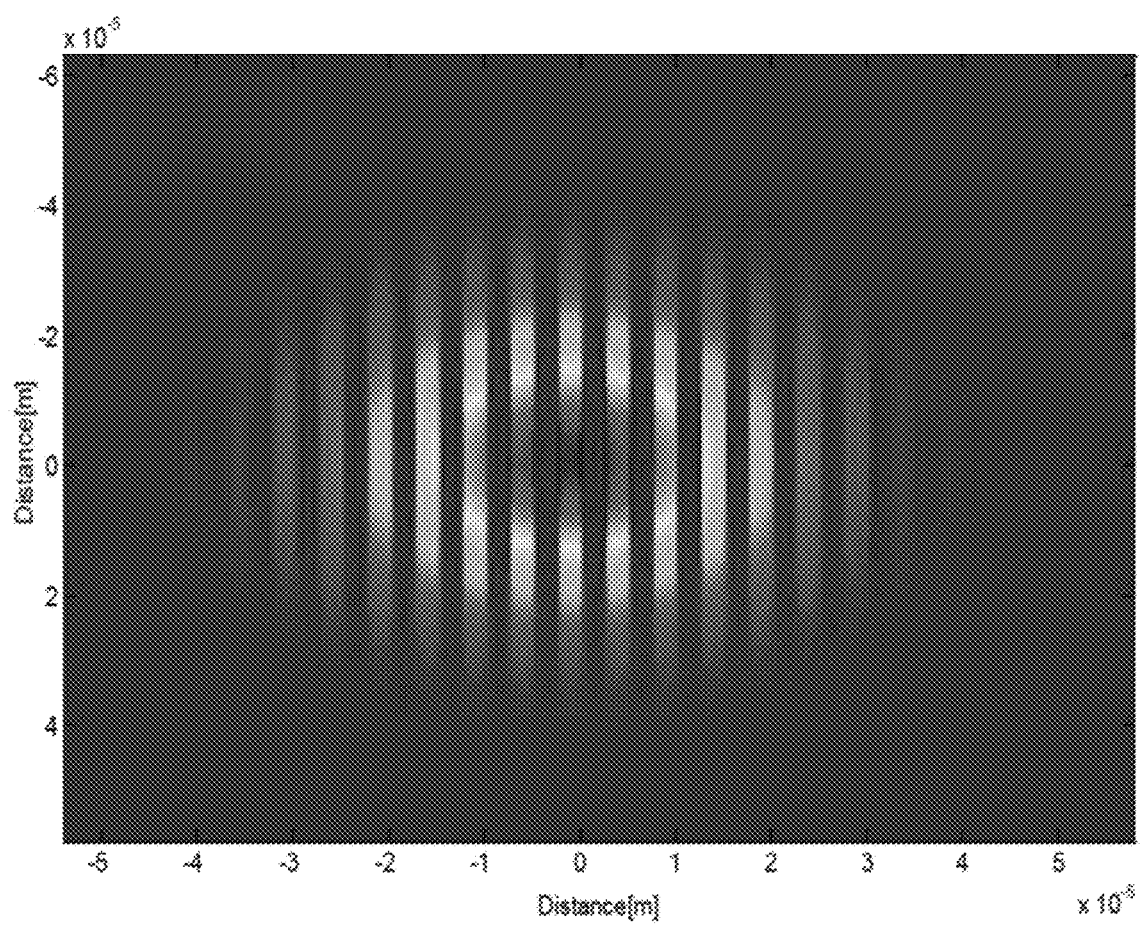
Figure 11B:
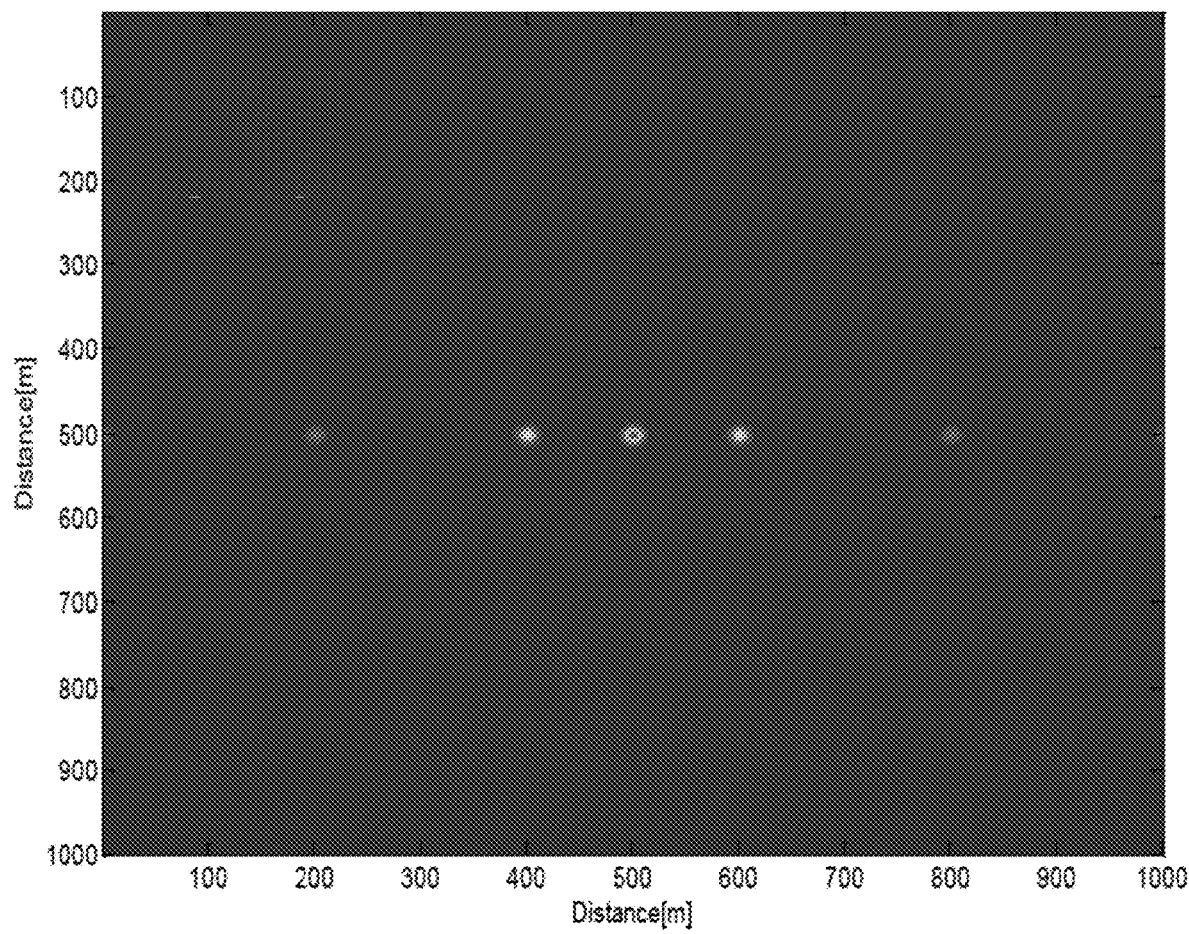
Figure 11C:
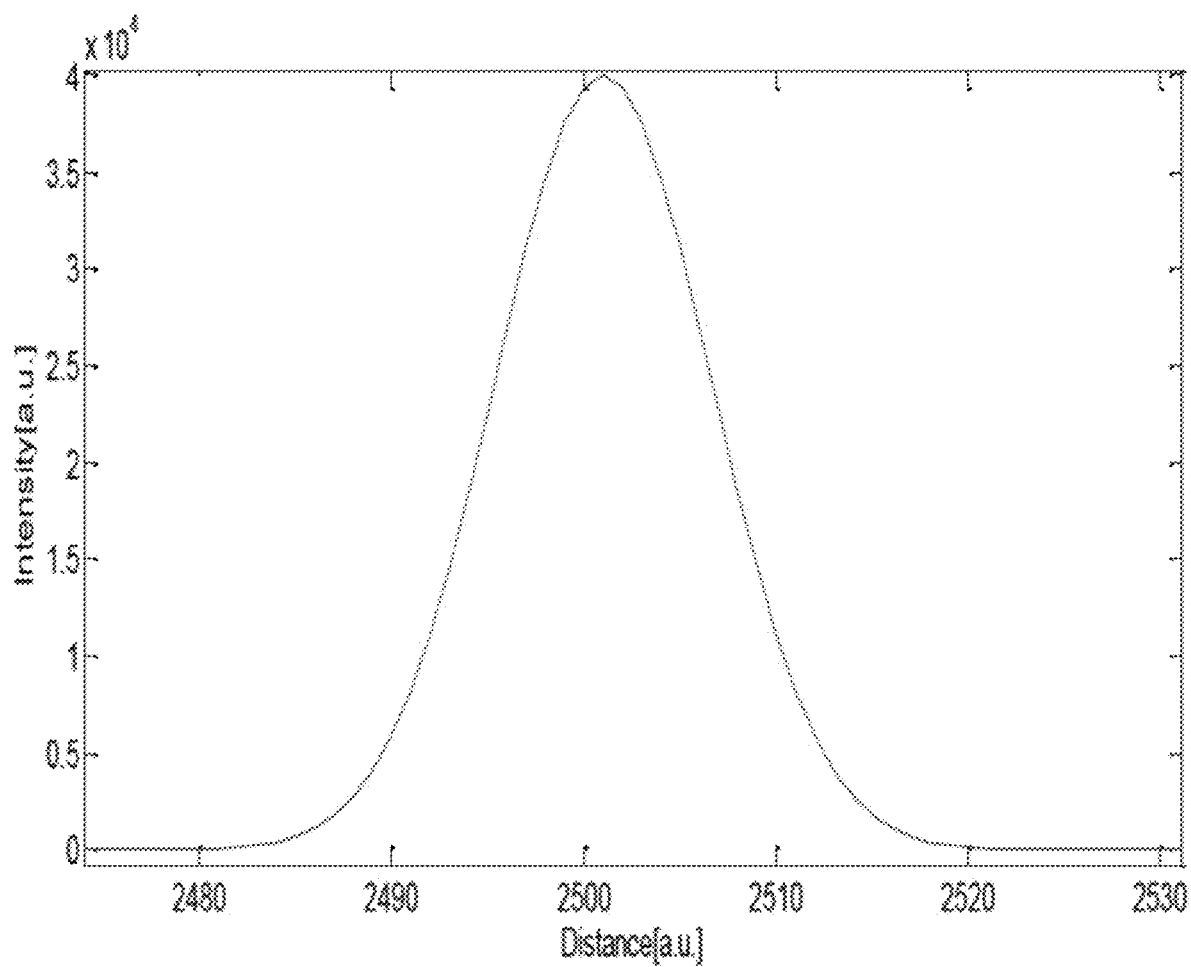

FIGS. 11A-11C show results of a first airy beam simulation.

Figure 12A:
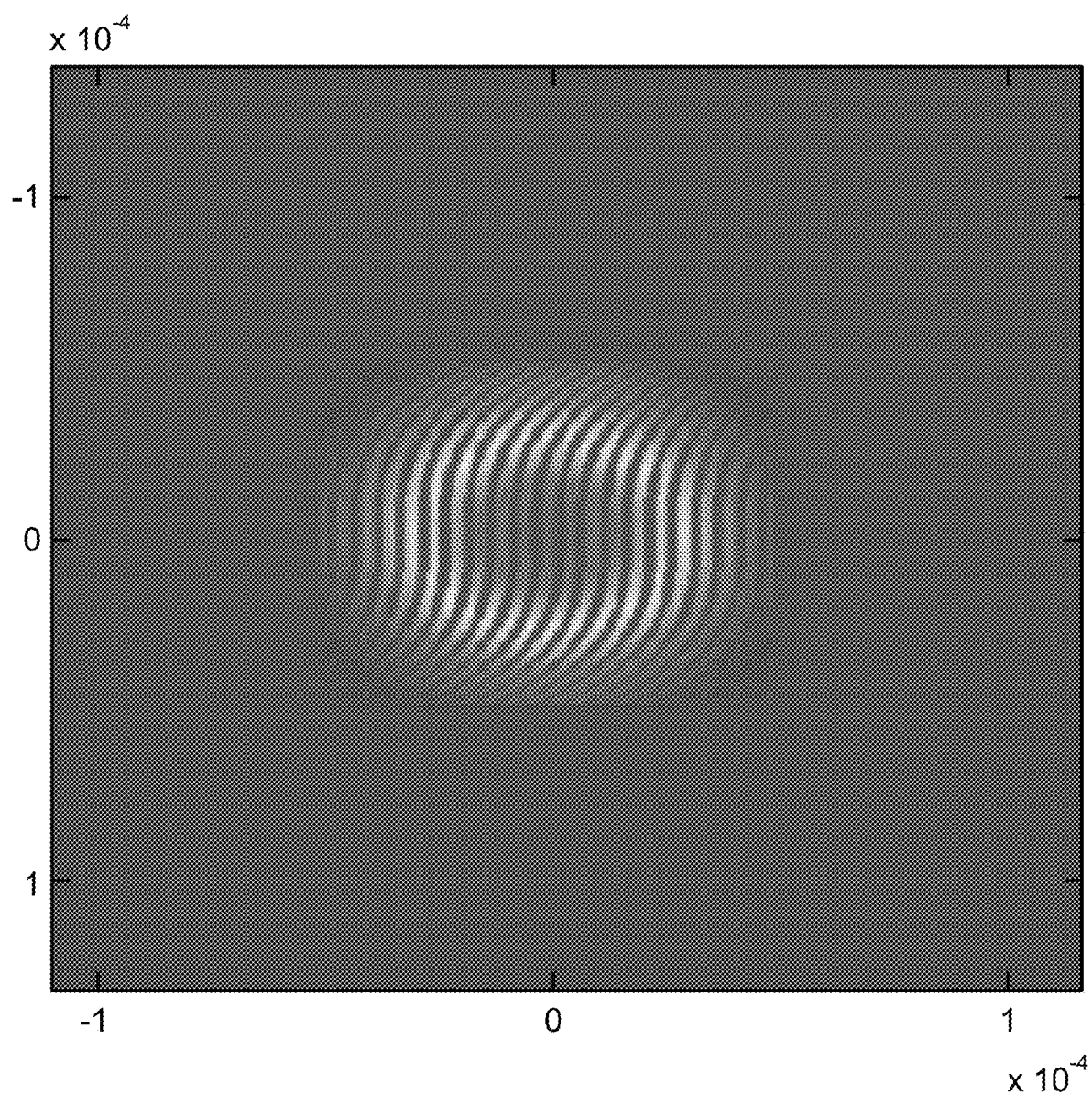
Figure 12B:
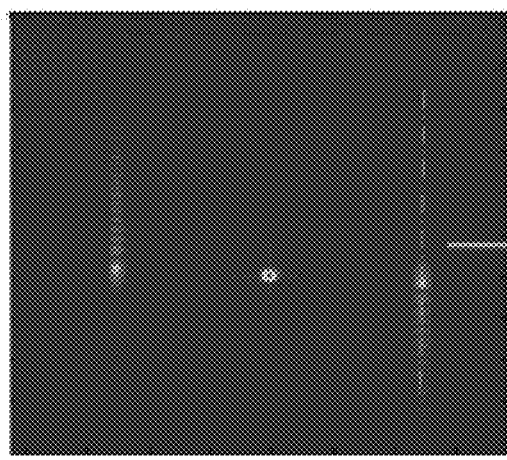
Figure 12C:
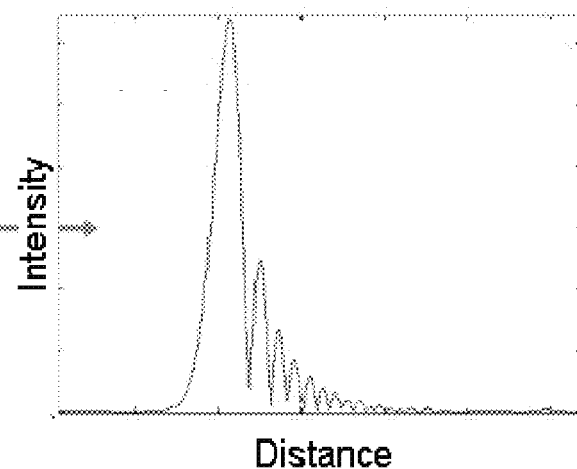

FIGS. 12A-12C show results of a second airy beam simulation.

Figure 13:
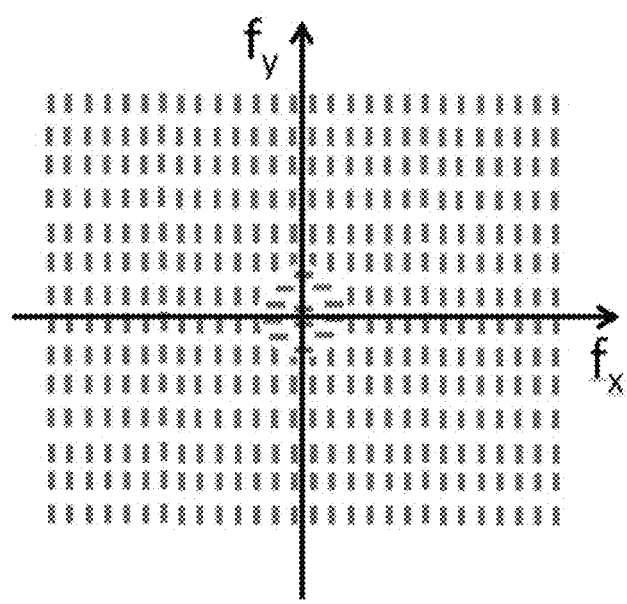

FIG. 13 is a schematic illustration of an array of resonators that encodes low spatial frequencies to one polarization and high spatial frequencies to other polarizations.

FIGS. 14A and 14B show scanning electron microscope (SEM) images of a small part of an FZP lens fabricated according to some embodiments of the present invention.

FIGS. 15A-15C are images showing full optical output of the fabricated FZP lens according to some embodiments of the present invention.

Figure 16:
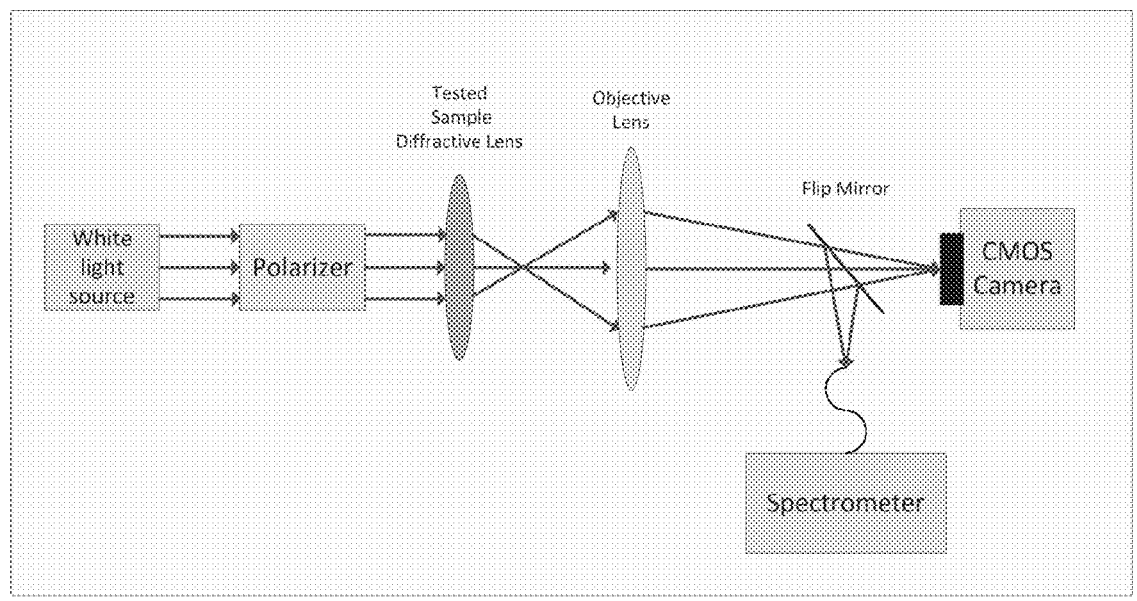

FIG. 16 is a schematic illustration of an experimental setup used for testing the fabricated FZP lens.

Figures 17A, 17B, 17C:
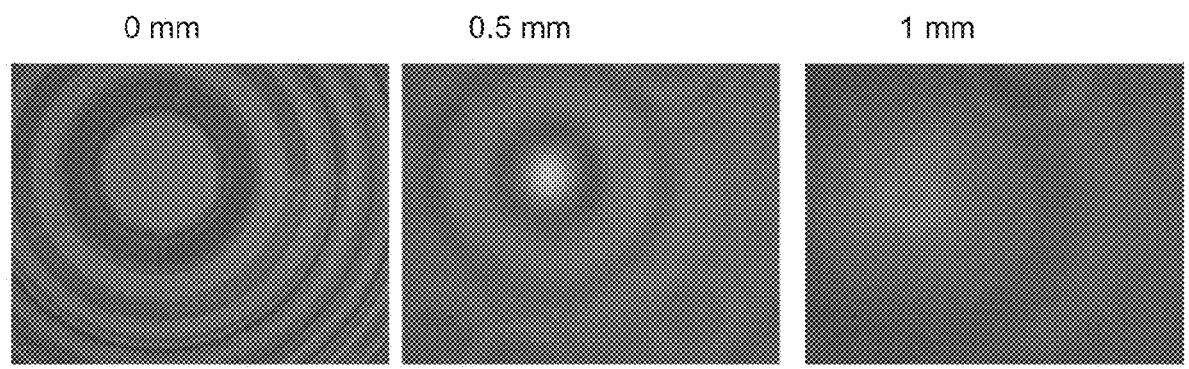

FIGS. 17A-17C show frequency response of the fabricated FZP lens at different z planes with different input polarizations.

Figures 18A, 18B, 18C:
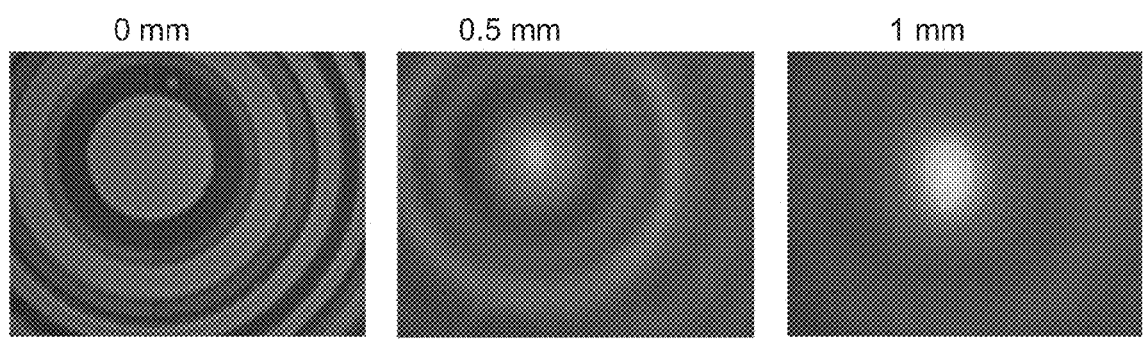

FIGS. 18A-18C show optical images of the fabricated FZP lens under white light illumination, polarity 90°, at different z planes.

Figure 19A:
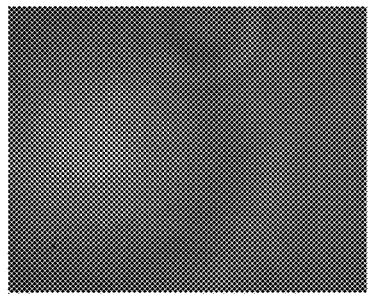
Figure 19B:
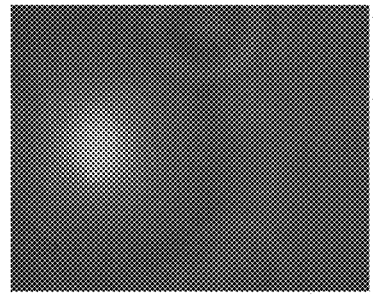
Figure 19C:
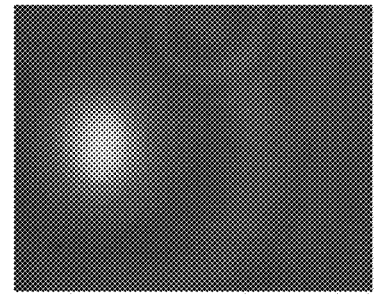

FIGS. 19A-19C shows a focal point with different input polarizations.

Figure 20A:
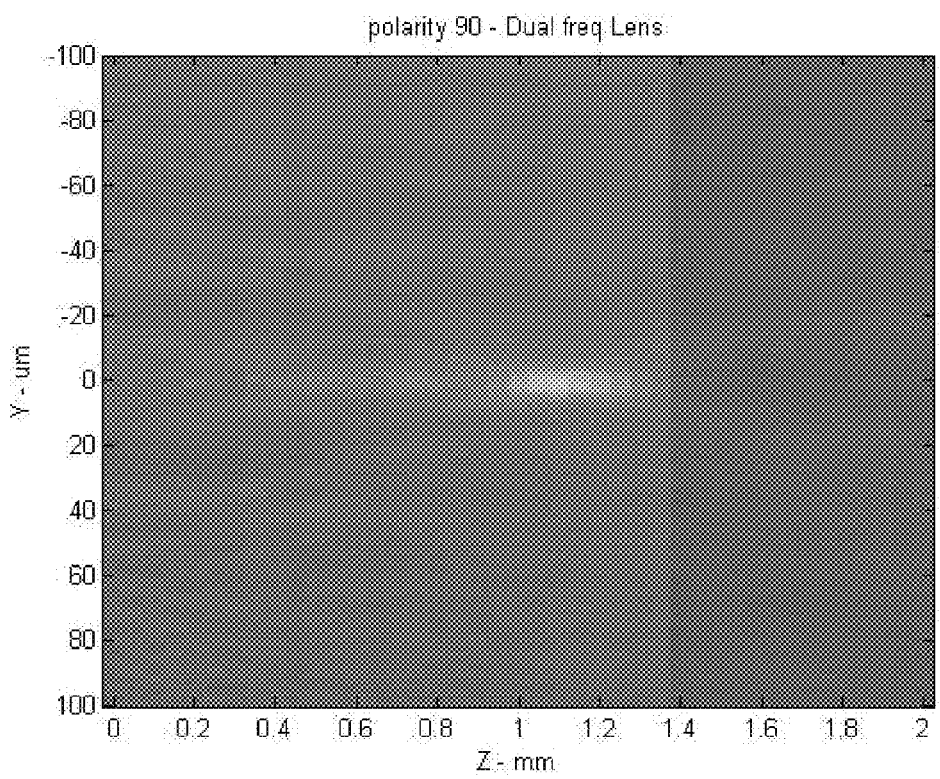
Figure 20B:
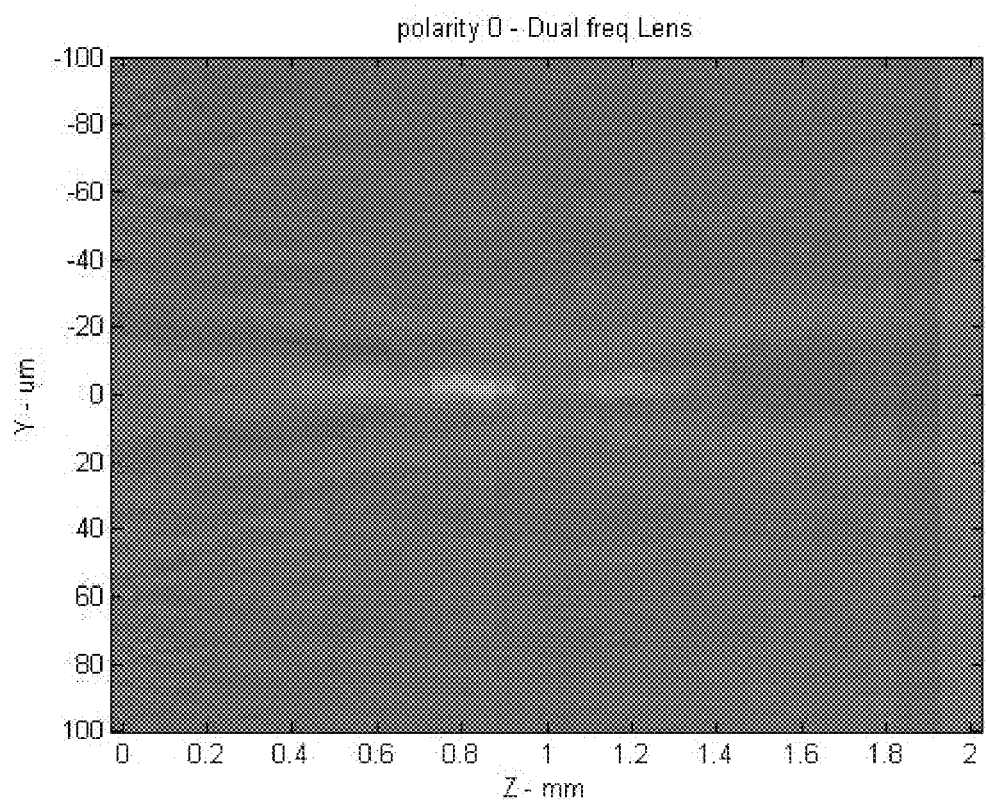

FIGS. 20A and 20B are images built from a sequence of images taken at different distances from the fabricated FZP lens.

Figure 21A:
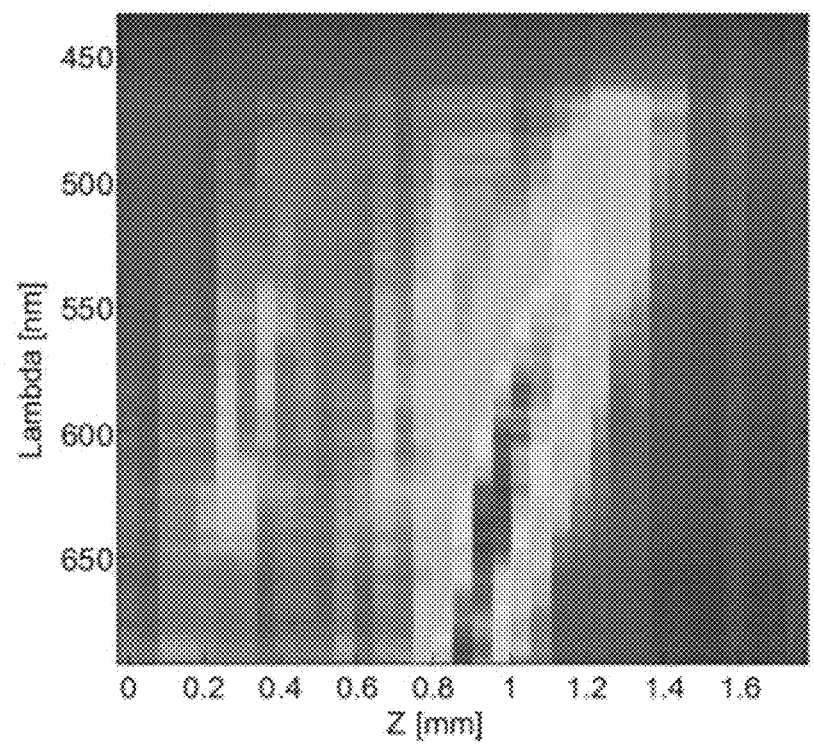
Figure 21B:
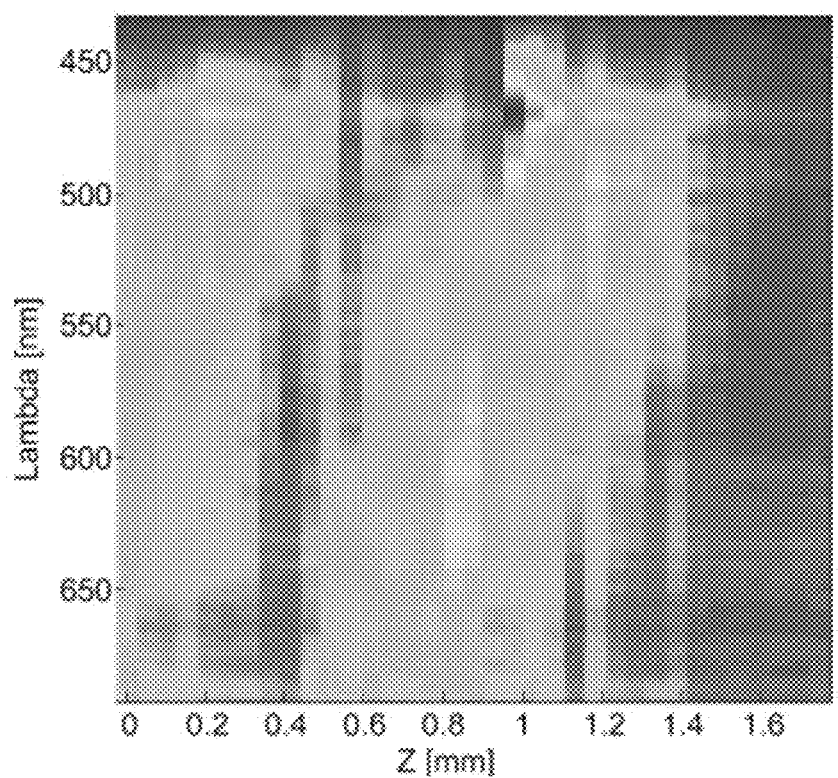
Figure 23A:
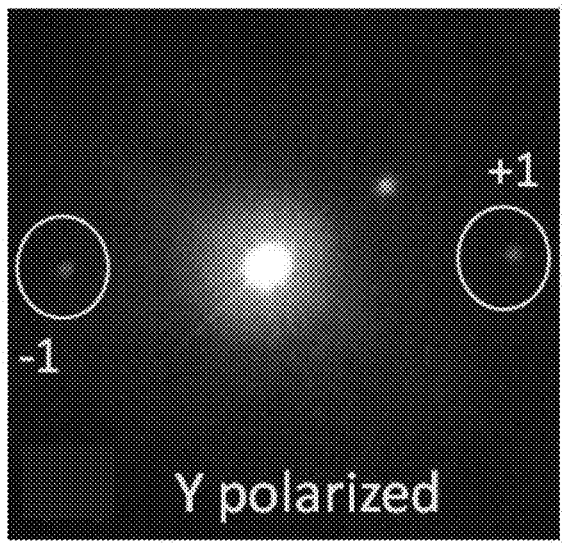
Figure 23B:
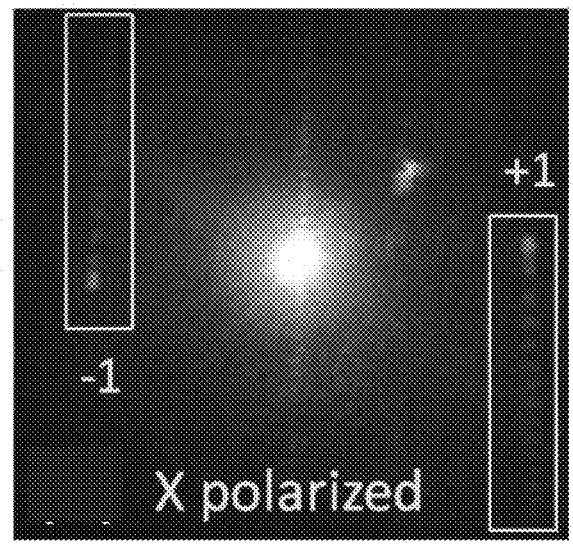
Figure 23C:
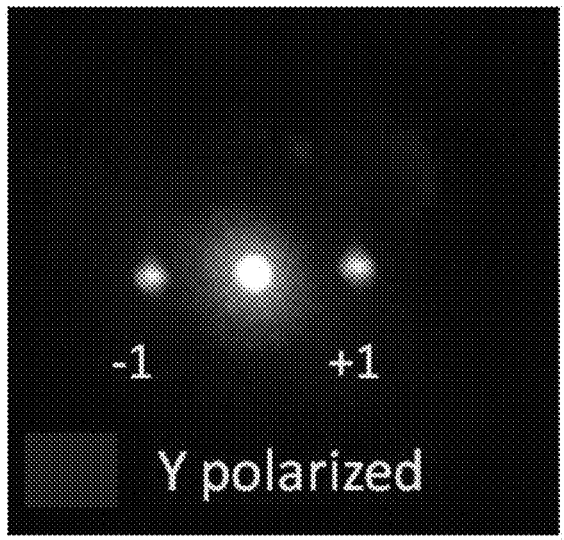
Figure 23D:
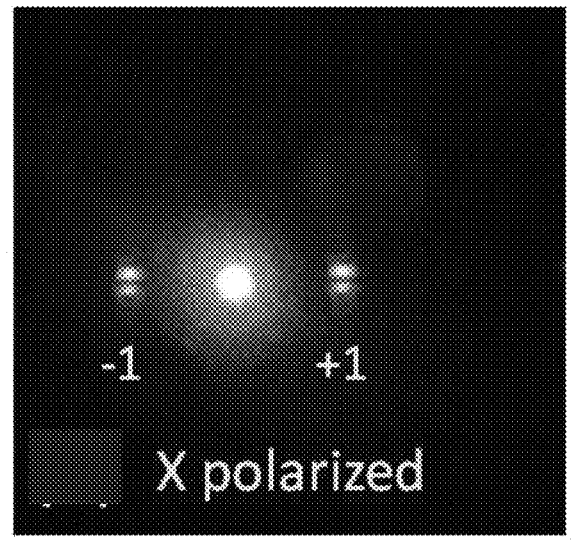

FIGS. 21A and 21B show spectrum on the propagation axis as a function of distance from the fabricated FZP lens.

FIGS. 22A-22D show white light transmission images through a dual polarization beam shapers at the two polarizations.

FIGS. 23A-23D show results of diffraction through a dual polarization beam shapers for wavelength of 730 nm.

FIGS. 24A-24D show results of a plasmonic beam study performed according to some embodiments of the present invention.

Figure 25A:
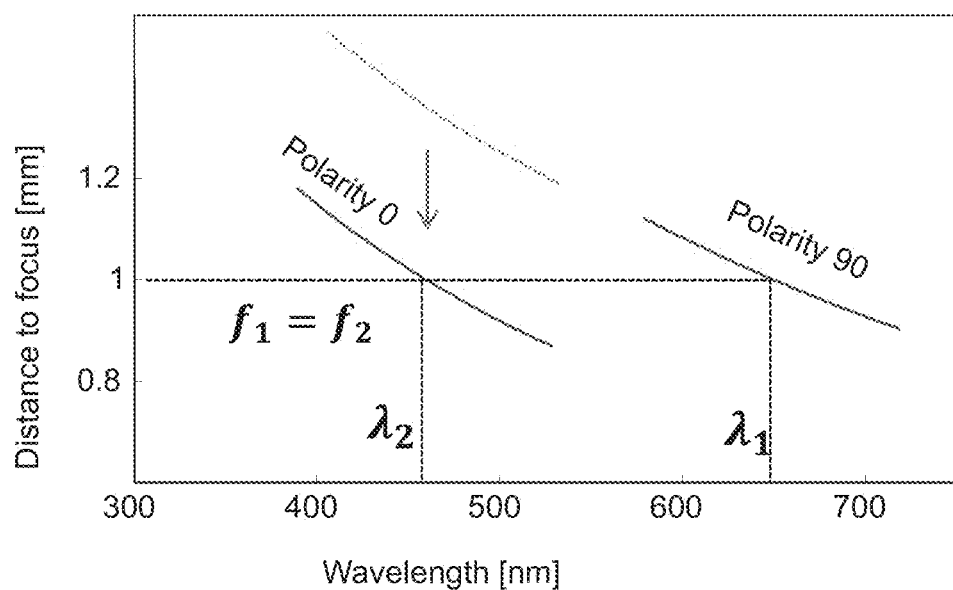

FIG. 25A shows focal distance as a function of the wavelength of an FZP designed according to some embodiments of the present invention to focus 650 nm and 460 nm light to 1 mm focal distance.

Figure 25B:
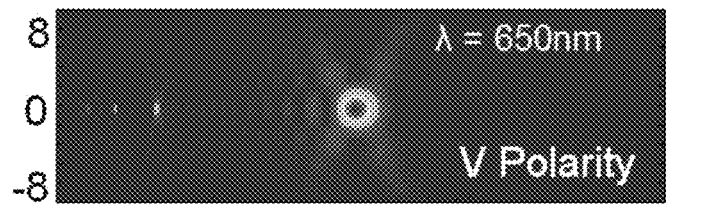
Figure 25C:
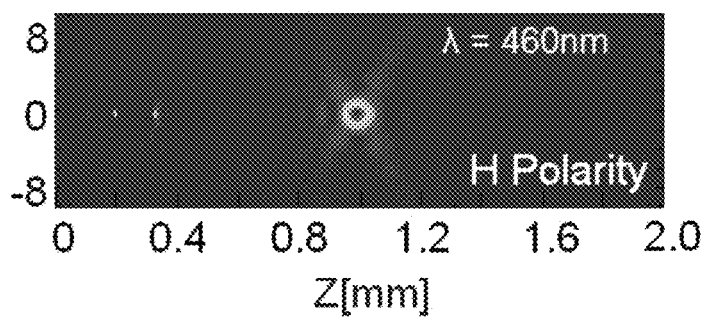

FIGS. 25B and 25C show simulation results of output beam propagation.

Figure 26A:
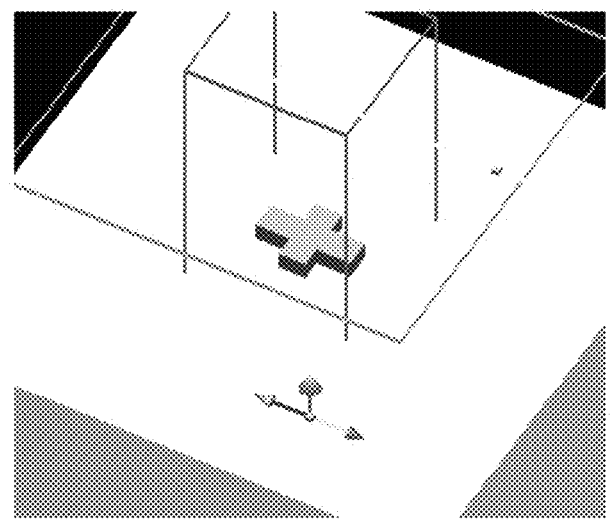
Figure 26B:
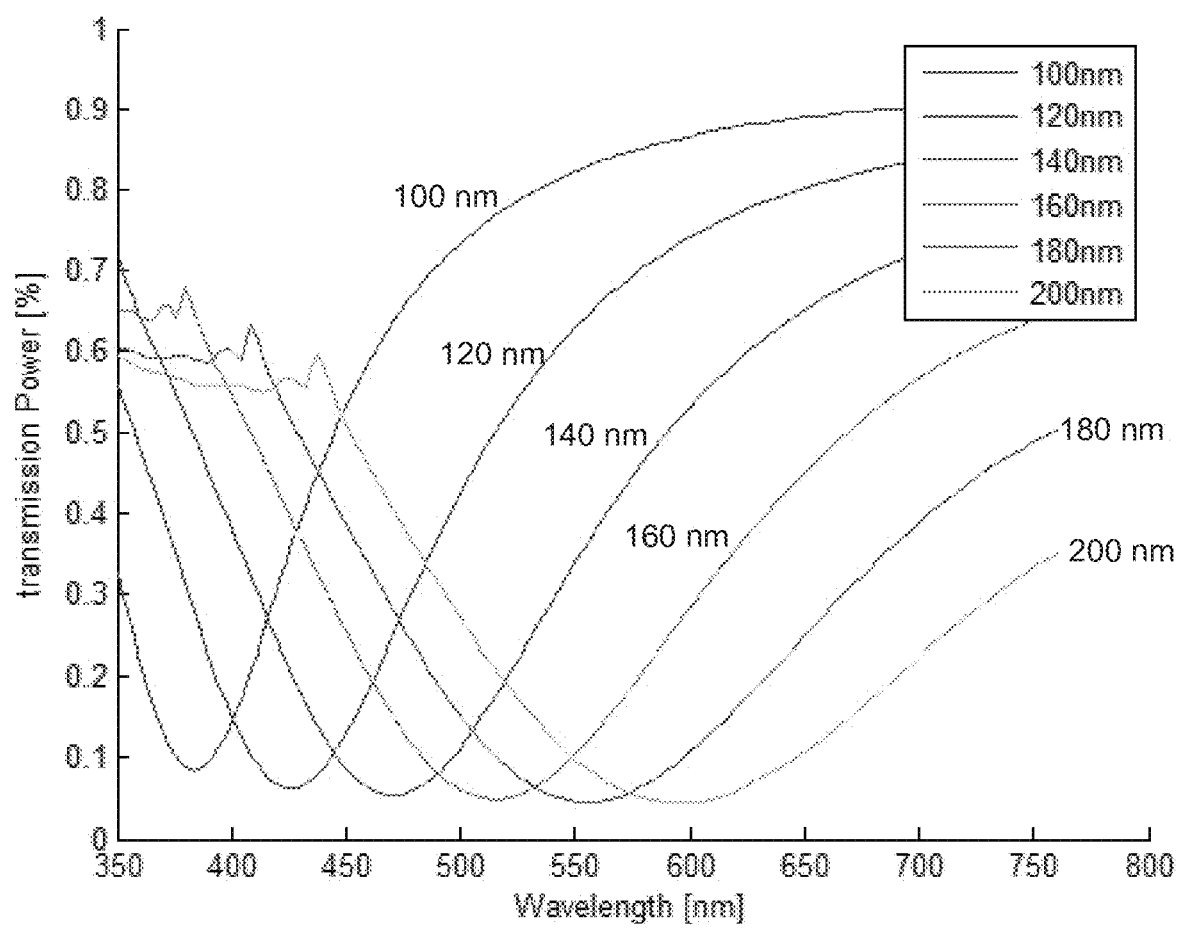

FIGS. 26A and 26B show shows setup and result of an FDTD simulation performed according to some embodiments of the present invention.

FIG. 27 shows a SEM image of another FZP lens, fabricated according to some embodiments of the present invention.

FIGS. 28A-28D show images of the operation of the fabricated FZP with incoherent polarized white light from a Xenon arc lamp.

FIGS. 29A and 29B are built from a sequence of images taken at different distances from the lens of FIG. 27.

Figure 30A:
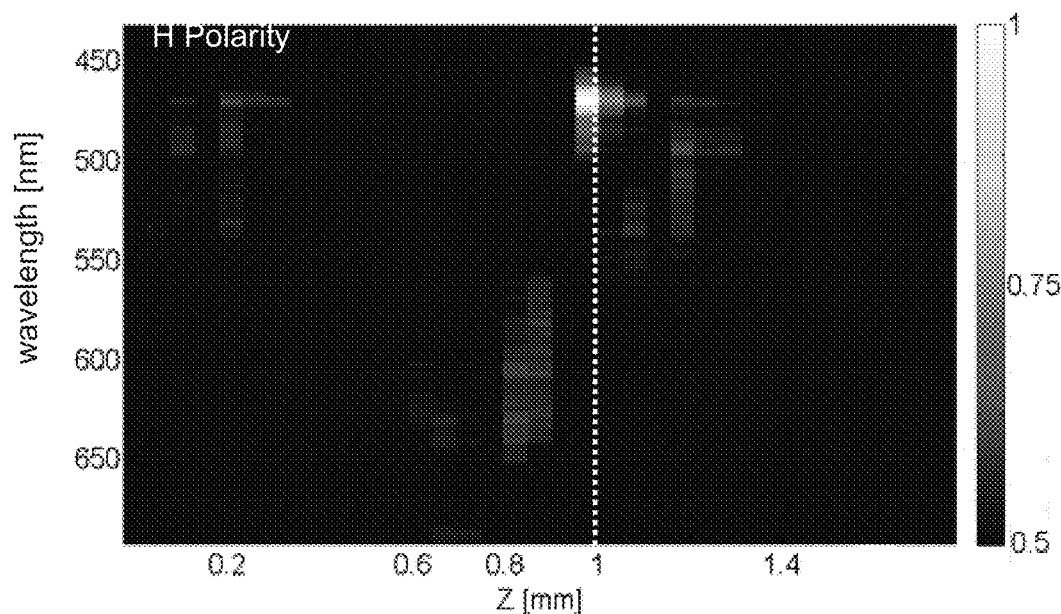
Figure 30B:
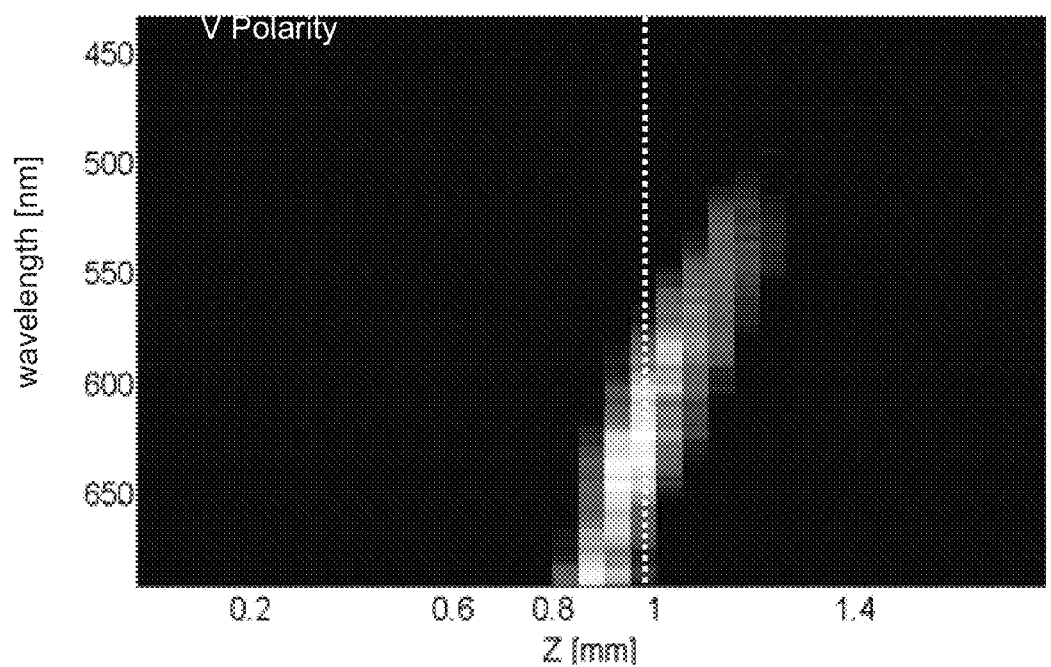

FIGS. 30A and 30B show spectral measurements of on axis light distribution after the lens of FIG. 27.

Figure 30C:
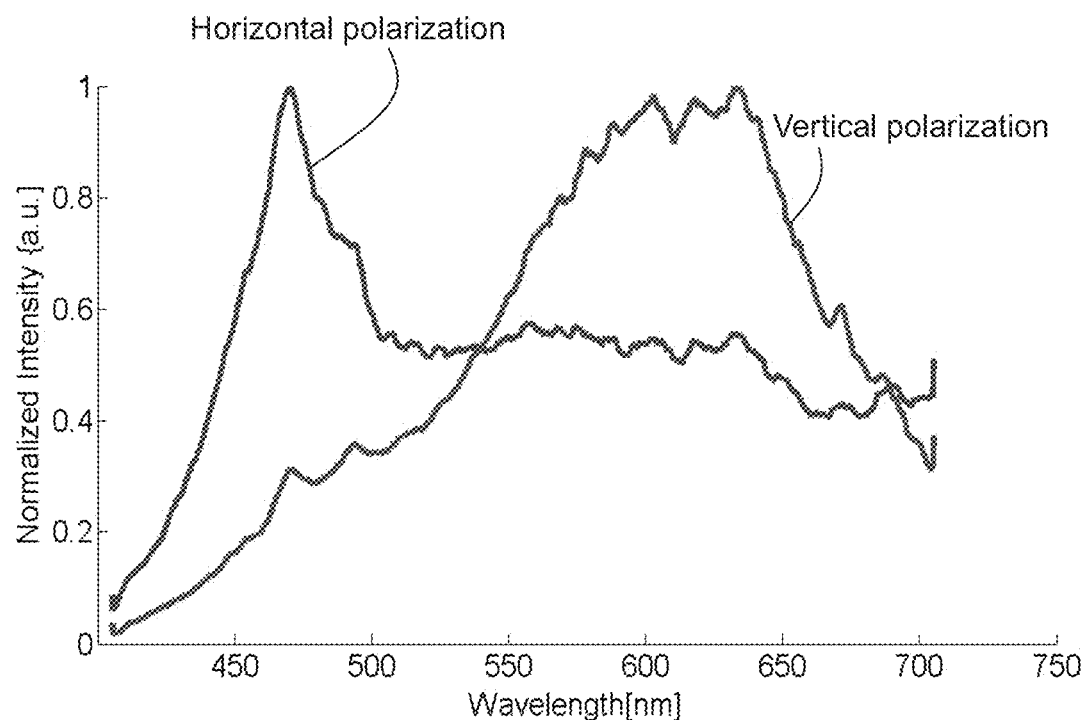

FIG. 30C illustrates normalized light intensity at a focal distance of 1 mm from the lens of FIG. 27.

Figure 31A:
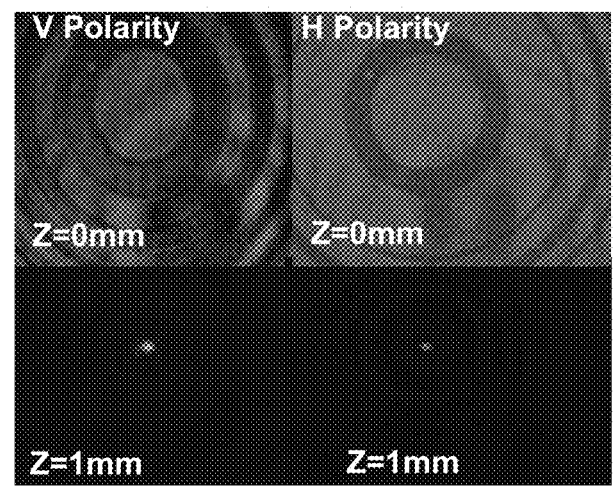
Figure 31B:
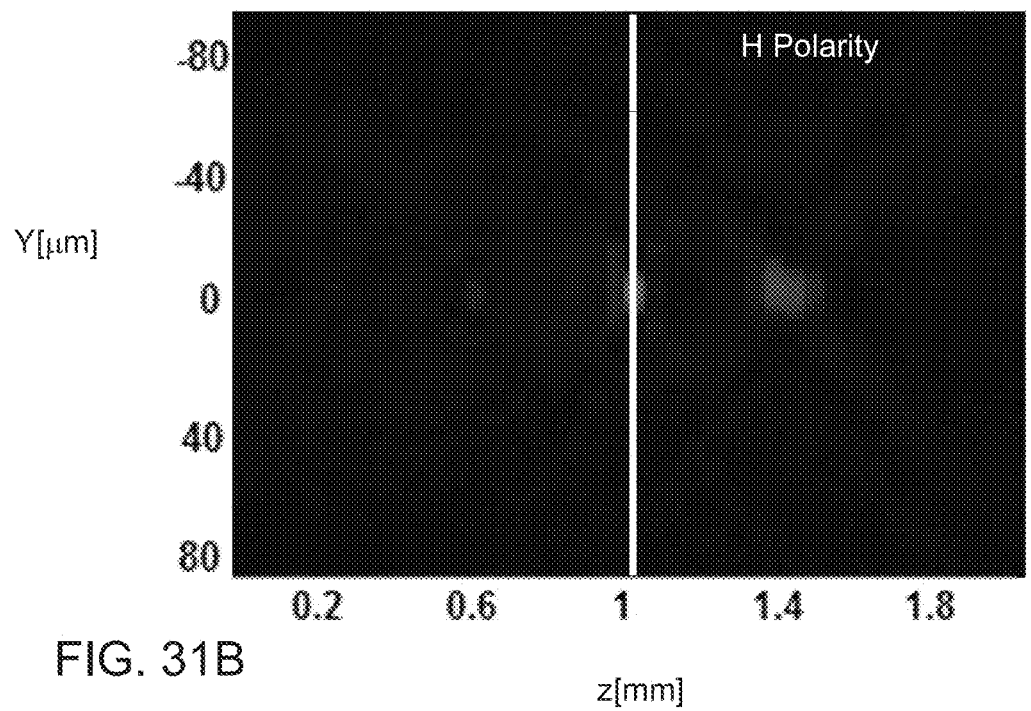
Figure 31C:
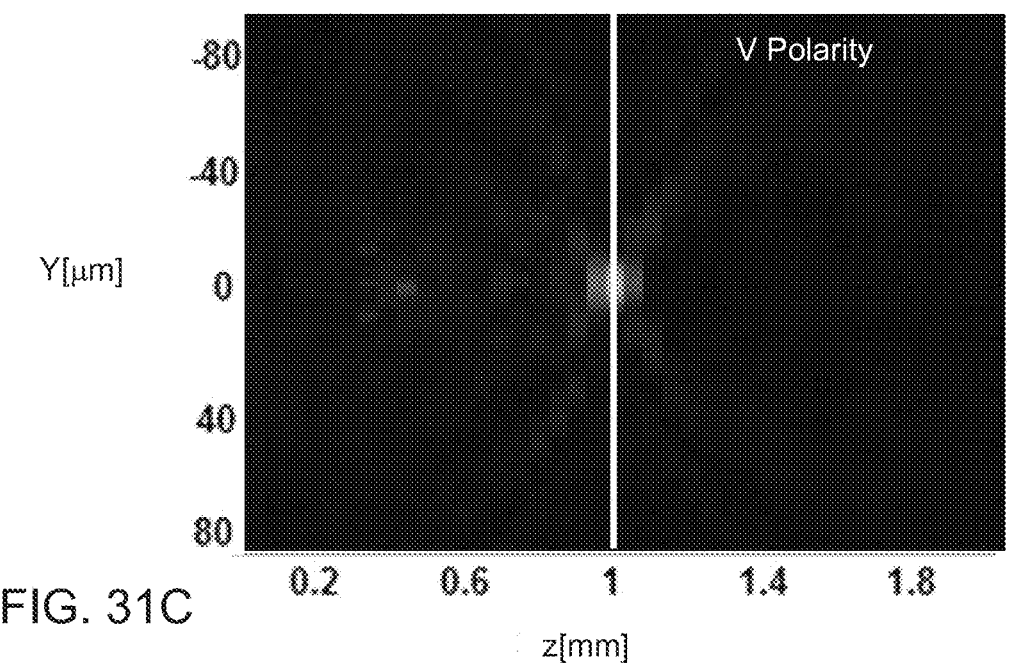

FIGS. 31A-31C show focusing measurements of the lens of FIG. 27 with coherent light illumination.

DESCRIPTION OF SPECIFIC EMBODIMENTS OF THE INVENTION

The present invention, in some embodiments thereof, relates to optics and, more particularly, but not exclusively, to a system and method for controlling light.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

For the purpose of providing a complete and self contained description of some embodiments of the invention, an introductory explanation of the principles of the diffraction theory will be provided.

Diffraction is a phenomenon which occurs when a wave encounters a small obstacle or small opening. Similar effects occur when a light wave travels through a medium with a varying refractive index. Diffraction occurs with all waves, including sound waves, water waves, and electromagnetic waves such as visible light, X-rays and radio waves.

When light illuminates a small slit or aperture, the light that passes through the slits diffracts to a series of spherical waves. These spherical waves form a diffraction pattern.

Figure 1A:
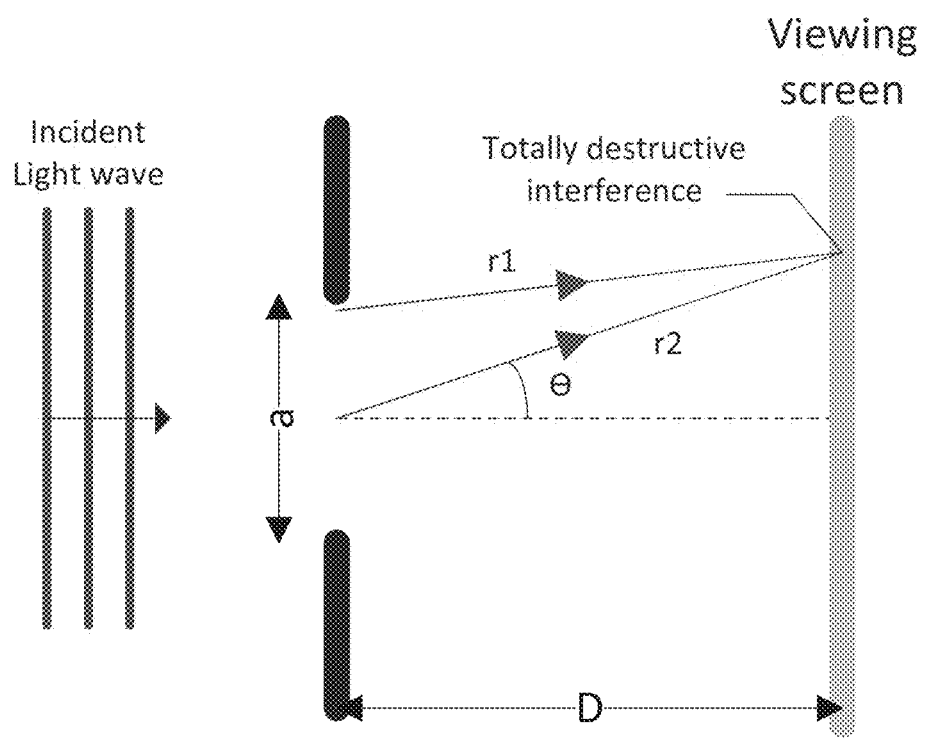
Figure 1B:
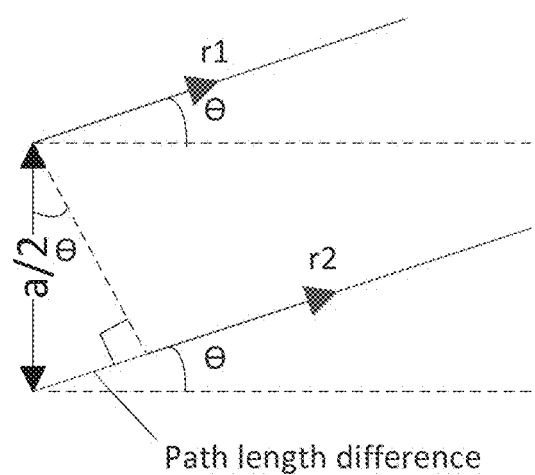

FIGS. 1A and 1B illustrate a plane wave incident upon a small slit with a width size a and a viewing screen at distance D. Using the notations in FIGS. 1A and 1B, the maxima of the obtained diffraction pattern, are at angles θ satisfying $$a \sin \theta = m\lambda, \qquad \text{EQ. 1}$$

and of the obtained diffraction pattern, are at angles θ satisfying $$a \sin \theta = (m+\tfrac{1}{2})\lambda \qquad \text{EQ. 2}$$

where m is an integer and λ is the wavelength of the light. FIG. 2 is representative example of an image of a diffractive pattern obtained using a single slit. The maxima are the bright spots and the minima are the dark spots.

A linear diffraction grating is an optical element that includes several slits, through which diffraction occurs. A linear diffraction grating is characterized by a so-called grating period or grating pitch, d, which is directly related to the wavelength, λ, and to the angle θ at which a ray of the light is diffracted. The relation is given by:

$$d \sin \theta = m\lambda \qquad \text{EQ. 3}$$

Schematic illustrations of a linear grating and the obtained diffraction patterns are provided in FIGS. 3A and 3B, respectively.

Figure 4:
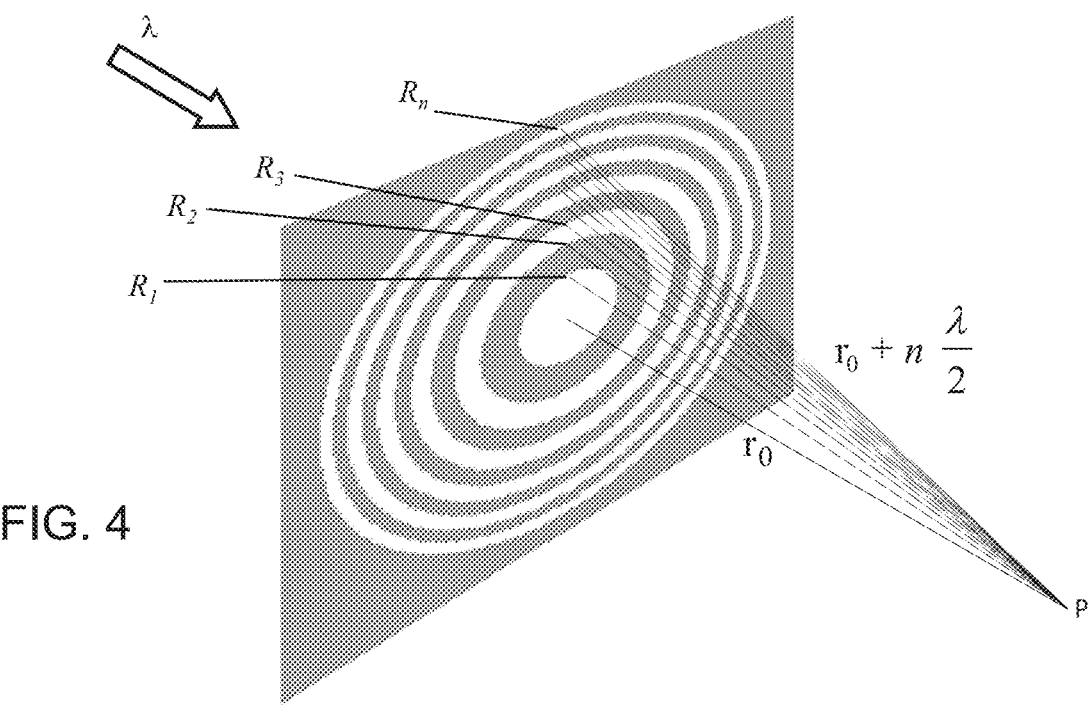

A binary diffractive lens, also known as a diffractive zone plate or a Fresnel zone plate (FZP), is an optical element which includes is zones in the form of concentric rings. The width of each zone is selected to focus the light to a focal point, P, located at the other side of the optical element. A representative example of a binary diffractive lens having n ring zones of radii $R_1, R_2, \ldots, R_n$ is illustrated in FIG. 4. The average distance of successive zones from P (focal point) differs by λ/2.

The radius of each ring can be calculated according to the following equation:

$$R_n^2 = \left(r_0 + n\frac{\lambda}{2}\right)^2 - r_0^2 = r_0^2\left[n\frac{\lambda}{r_0} + \frac{n^2}{4}\left(\frac{\lambda}{r_0}\right)^2\right], \qquad \text{EQ. 4}$$

where $r_0$ is the distance from the center of the lens to the focal point (see FIG. 4). When $r_0$ is much longer than the wavelength λ (e.g., $r_0 > 10\lambda$), the expression of $R_n$ simplifies to:

$$R_n \approx \sqrt{nr_0\lambda}. \qquad \text{EQ. 5}$$

A maximal light intensity at P can be obtained by blocking all even rings $R_2, R_4, \ldots$.

It was found by the present inventors that while conventional techniques can divert and control light, they suffer from large chromatic aberrations. The present inventors have devised an optical system and method employing diffractive optical elements that control light in a wavelength and polarization selective manner. It was found by the present inventors that the optical system of the present embodiments can correct the chromatic aberrations which are inherent in conventional diffractive optical elements and, in some embodiments, be used to create hyper and multi-spectral optical elements.

The system and method of some embodiments of the invention exploit nanoscale physical phenomena to control light. In some embodiments, the excitation modes of localized surface plasmons on nanostructures metal-dielectric materials are used to control the phase and amplitude of transmitted and reflected light.

The system and method of some embodiments of the invention can be used to control the shape of optical beams. A bundle of rays of light irradiated upon the optical element(s) of the present embodiments is modified in a defined way with respect to its beam parameters. These embodiments are useful, for example, in practical applications in which it is required that a bundle of rays forming a light beam has a defined geometric shape with respect to its cross section, e.g., a circular, rectangular or lattice-like shape or the like, and an intensity profile defined across its cross section. Some embodiments of the invention allow both properties to be controlled simultaneously. For example if the light source delivering the incoming bundle of rays supplies a bundle of rays with a particular intensity distribution and a particular geometric dimensions, but defined specifications of some application require a bundle of rays with another intensity distribution and/or other geometric dimensions, the optical elements of the present embodiments can be used to reshape the bundle of rays.

The beam shaping of the present embodiments can be employed in many applications. One example is laser applications, in which it is desired to control the shape of the laser beam for the desired use. The laser output beam quality and shape determine the quality, quantity and efficiency of, for example, work piece machining. Another example is the area of communication whereby optical signals are transmitted between various optical components. A conventional light-emitting module incorporated in an optical communications system generally includes a light source (e.g., a laser diode), an optical fiber and a lens interposed between the light source and optical fiber for converging the light beam onto the core of the optical fiber. It is recognized that the communication efficiency depends on the ability of the lens to provide the optical signal passing with the proper intensity profile so as to reduce coupling losses. The optical elements of the present embodiments can provide the beam with an intensity profile that improves the communication efficiency. An additional example is optical scanning. Optical scanners, such as bar code scanners, typically make use of light from laser diodes which are moved to provide the scanning beam. Such diodes are robust and relatively inexpensive, but the beam emerging from a laser diode is typically astigmatic. When a bar code symbol is to be scanned it is generally desirable for the beam width to be relatively small at the point at which it impinges upon the bar code symbol, to provide proper discrimination between the bars and spaces. On the other hand, it is desirable to have the perpendicular dimension relatively large to minimize noise. The optical element of the present embodiments can control the intensity profile of such optical scanners to allow noise free reading with minimal astigmatism.

The system and method of some embodiments of the invention can be used to control the shape of near field beams, such as, but not limited to, surface-plasmon polaritons (SPP). SPP are surface-bound waves that can propagate, e.g., along a metal-dielectric interface or along a metal-vacuum interface. SPP can be qualitatively viewed as a combination of electromagnetic waves and associated charge waves. The electromagnetic waves propagate along the interface due to their interaction with free surface charges of the metal. The interaction also causes the surface charges to oscillate in resonance with the electromagnetic wave. The combined physical entity created via this resonant interaction. Thus, an SPP is an entity including a charge wave and an electromagnetic wave.

Some embodiments relate to the use of polarizers with spatially changing polarization. The polarizers can be continuous (e.g., wires) or discrete (e.g., plasmonic, such as, but not limited to, nanoresonators).

Some embodiments of the present invention relate to an optical material, having improved optical properties. For example, in some embodiments of the present invention the frequency response and/or polarization response of the optical material is directly controlled by specific engineering of the material.

Unlike the conventional techniques, the present inventors successfully corrected chromatic aberrations and fabricated optical elements with multiple functionalities using nanoresonators. Some embodiments of the present invention comprise a diffractive optical element (DOE) that operates at least at visible wavelengths with corrected chromatic aberrations and/or with multiple optical functionalities. The method and system of the present embodiments can be used to manipulate the amplitude and/or phase of the optical field. In some embodiments of the present invention the DOE is polarization-sensitive and wavelength-selective, thereby allowing to fabricate an optical system which is operative at a plurality of different wavelengths and polarizations with reduced (e.g., minimal) cross-talk.

The system and method of the present embodiments is advantageous over traditional flat optics technologies which are bulky and/or expensive. For example, system and method of the present embodiments can be used for imaging. The advantage of the DOE of the present embodiment is that it has show superior color and polarization functionality over traditional phase and amplitude plates. Some embodiments of the present invention relate to hybrid elements which combine conventional optics with nanoresonators. For example, the nanoresonator can be printed on conventional optics.

Figure 5:
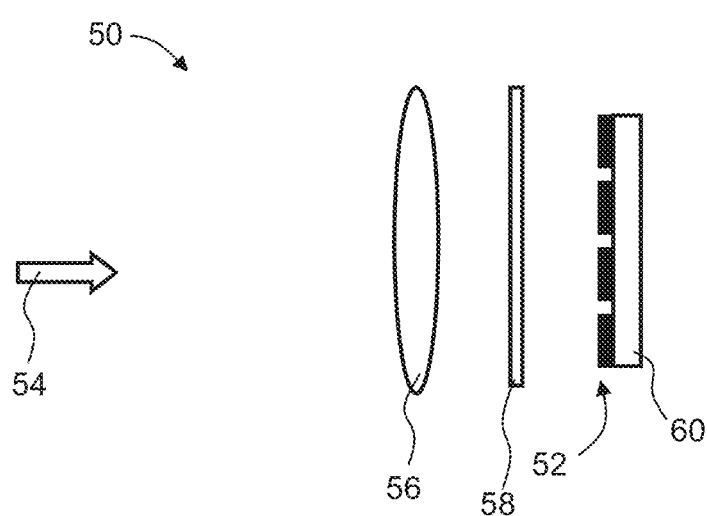

Referring now again to the drawings, FIG. 5 is a schematic illustration showing a side view of an optical system 50, according to some embodiments of the present invention.

System 50 can be used for a variety of applications. For example, in some embodiments of the present invention system 50 is employed as a component of a lens system, in some embodiments system 50 is employed as a component of beam shaping system, in some embodiments system 50 is employed as a component of an imaging system, in some embodiments system 50 is employed as a component of an optical sensor system, in some embodiments system 50 is used for reducing longitudinal chromatic aberrations, in some embodiments system 50 is used for reducing transverse chromatic aberrations, in some embodiments system 50 is used for reshaping a profile of a light beam, in some embodiments system 50 is used for hyper spectral imaging, in some embodiments system 50 is used for spectroscopy, in some embodiments system 50 is used for obtaining spatial spectral dependence of sample or image, and in some embodiments system 50 is used for filtering spatial frequencies of image.

System 50 comprises an array 52 of optical resonators. Preferably, but not necessarily, array 52 is planar. Array 52 can be carried by a substrate 60, which is preferably light-transmissive, and which can be made generally rigid or flexible as desired. Substrate can be made of any light transmissive solid material, including, without limitation, glass and a transparent polymer. The resonators can be formed on substrate 60 using any technique known in the art including, without limitation, deposition, printing, etching lithography and the like. Resonators 52 can be formed on any of the surfaces of substrate 60 and can be configures for providing diffraction in either reflective or transmissive mode. Although FIG. 5 illustrates a system having a single array of optical resonators, this need not necessarily be the case, since system 50 can comprise any number of arrays of optical resonators, each of which can be made planar. When more than one array is employed, the different arrays can engage the same surface (for example, two or more arrays can be formed on the same side of substrate 60), or they can engage different (e.g., spaced apart) surfaces.

Resonators 52 have resonance responses to optical field 54 interacting therewith.

As used herein, "resonance response" refers to situation at which the interaction amplitude between a resonator and an optical field exhibits a maximum as a function of at least one optical property (frequency, wavelength, polarization).

Generally, the size of the resonator can be selected to effect resonant response at a particular frequency or wavelength, and the orientation of a resonator can be selected to effect resonant response at a particular polarization.

Optical field 54 is typically a light beam, e.g., a polychromatic light beam. In some embodiments, the light beam is white, and in some embodiments of the present invention light beam 54 carries imagery information, hence constitutes an image. For example, array 52 can be positioned at or near a Fourier plane of an image.

In some embodiments of the present invention at least some of resonators 52 are nanoresonators.

As used herein, "nanoresonator" refers to a resonator having at least one, more preferably at least two nanoscale dimensions.

When nanoresonators are employed, the resonant response can be plasmonic excitation. In some embodiments, the nanoresonators are elongated, in which case the nanoresonators are provided as elongated nanostructures.

The term "elongated nanostructure" generally refers to a three-dimensional body made of a solid substance, in which one of its dimensions is at least 2 times, or at least 10 times, or at least 50 times e.g., at least 100 times larger than any of the other two dimensions. The largest dimension of the elongated solid structure is referred to herein as the longitudinal dimension or the length of the nanostructure, and the other two dimensions are referred to herein as the transverse dimensions. The largest of the transverse dimensions is referred to herein as the diameter or width of the elongated nanostructure. The ratio between the length and the width of the nanostructure is known as the aspect ratio of the nanostructure.

In various exemplary embodiments of the invention the length of the elongated nanostructure is at least 50 nm, or at least 100 nm, or at least 500 nm, or at least 1 µm, or at least 2 µm, or at least 3 µm, e.g., about 4 µm, or more. The width of the elongated nanostructure is preferably less than 1 µm. In various exemplary embodiments of the invention the width of the nanostructure is from about 30 nm to about 200 nm.

The elongated nanostructures of the present embodiments can be of any type known in the art. The nanostructures can be continuous where they act as broadband polarizers or discrete where they act on certain wavelengths according to their plasmonic resonance. The nanostructures can be nanowires, in which case they can have a solid elongated structure (namely non-hollow structure), or they can be nanotubes, in which case they can have an elongated hollow structure. The nanostructures can also have a core-shell structure. The nanostructures can also be embodied as apertures in metal films. Representative examples of materials suitable for use as the elongated nanostructures of the present embodiments include, without limitation, metal, e.g., gold, silver, aluminum, chromium and platinum.

One or several of optical resonators 52 can also be provided as nanoantennas. Also contemplated are other types of optical resonators 52, including, without limitation, resonant cavities, nano-apertures and quantum confinement structures.

Nanoresonators 52 can be spatially ordered to polarize or effect light polarization over a cross section of light beam 54 (or an image constituted by light beam 54), for at least one wavelength. Nanoresonators 52 can be spatially ordered to polarize or effect light polarization, e.g., spatially varying polarization, over a cross section of light beam, or an image, for any wavelength within a wavelength range spanning over at least 100 nm or at least 200 nm or at least 400 nm or at least 600 nm or at least 800 nm or at least 1000 nm.

Nanoresonators 52 can be spatially ordered to polarize or effect light polarization, e.g., spatially varying polarization, for at least two or at least three or at least four or at least five or at least six or more different wavelengths. Preferably the different wavelengths are at least 10 nm or at least 20 nm or at least 30 nm from each other.

System 50 optionally comprises also a refractive optical element 56 (e.g., a lens), positioned on the same optical axis with array 52. In some embodiments of the present invention, optical resonators 52 are deposited or printed on the refractive surface of element 56. Alternatively, array 52 can be spaced apart from element 56 as illustrated in FIG. 5.

Array 52 can be constituted to reduce chromatic aberrations associated with refractive optical element 56. This can be done, for example, by providing array 52 with two or more types of resonators, wherein the resonators of each type have a resonant response to an optical field at a different wavelength.

In some embodiments of the present invention at least one optical resonator of a first type is laterally displaced from any optical resonator of a second type (or any another type), and at least one optical resonator of the first type partially overlaps with at least one optical resonator of the second type (or one of the other types). A representative example of this embodiment is provided in the Examples section that follows.

The array 52 is optionally configured to focus the first and second wavelengths, and optionally also one or more other wavelengths, generally onto the same focal plane. In some embodiments, array 52 is configured to focus white light at a single focal plane.

Aside for handling the frequency of the incoming optical field, array 52 can optionally and preferably also handles the polarization. In these embodiments, system 50 can comprise a polarizer 58 constituted to polarize optical field 54 prior to an incident of optical field 54 on array 52. In some embodiments, optical resonators that have a resonant response to an optical field at a particular wavelength also have a resonant response to an optical field at a particular polarization. These embodiments allow system 50 to be both frequency selective and polarization selective. For example, array 52 can be configured to focus onto the same focal plane both an optical field having a first wavelength and a first polarization, and an optical field having a second wavelength and a second polarization. Alternatively, array 52 can be configured to focus the two polarizations onto different focal planes.

Array 52 can be also be used for beam shaping. For example, in some embodiments, array 52 is configured to provide a polarization-dependent beam profile, and in some embodiments array 52 is configured to provide a wavelength-dependent beam profile.

In some embodiments of the present invention array 52 provides, at the output, an optical field or a near field (e.g., an SPP) that has a first profile when the input field 54 has a first polarization, and another profile when the input field 54 has a second polarization. Representative examples of obtainable profiles include, without limitation, Gaussian profile, Hermite Gaussian profile and Airy profile. This can be achieved by selection array 52 to impose phase onto a diffracted beam, and selectively change the output beam shape depending on the input polarization.

Preferably, the first and second polarizations are linear polarizations that are orthogonal to each other. For example, the first polarization can be a linear polarization along the X direction and the second polarization can be a linear polarization along the Y direction. The first and second profiles are preferably different from each other in a manner that they cannot be described by the same family of functions, or that their functional dependence cannot be superimposed onto each other by scaling operation. For example, the first profile can be a Gaussian profile and the second profile can be a profile other than a Gaussian profile, e.g., an Airy profile. Alternatively, the first profile can be an Airy profile, and the second profile can be a profile other than an Airy profile and other than a Gaussian profile.

As a representative example, array 52 can be arranged as a binary grating described by the following function:

$$h(x, y) = \frac{1}{2}h_0\left\{\text{sign}\left(\cos\left(\frac{2\pi}{\Lambda}x + \phi(x, y)\right)\right) + 1\right\} \quad \text{EQ. 6}$$

where $\Lambda$ is the grating period. Such a grating can provide an Airy beam when light field 54 is a Gaussian beam with a cubic phase in the y direction, e.g., $\phi(x)=by^3$.

In some embodiments of the present invention array 52 couples and decouple the incoming optical field to a near field (e.g., an SPP). For example, the incoming optical field can switch on propagation of surface plasmons only when the incoming optical field has a specific predetermined polarization (e.g., a linear polarization along a predetermined first direction), while reducing or preventing the propagation surface plasmons when the incoming optical field has another polarization (e.g., a linear polarization along a second direction which is orthogonal to the first direction).

In some embodiment of the present invention array 52 provides wavelength-dependent and/or polarization-dependent optical transmission. Generally, the transmission function T of a particular resonator of array 52 can be written as:

$$T(\varphi,\lambda,x,y)=T_V(\lambda,x,y)\sin^2(\varphi)+T_H(\lambda,x,y)\cos^2(\varphi) \quad \text{EQ. 7}$$

where $T_V(\lambda,x,y)$ and $T_H(\lambda,x,y)$ are spatial transmission responses of the resonator to vertically and horizontally polarized light, respectively, x and y are Cartesian coordinates, and $\varphi$ is the angle between the polarization of incoming light and the X axis. The properties of the resonator at location x, y over the array, particularly its size, shape and orientation, are optionally and preferably selected in accordance with the desired total transmission T at wavelength $\lambda$ and polarization $\varphi$.

Some embodiments of the present invention comprise an optical system that comprises spatially dependent polarizers. The polarizers can be optical resonators as further detailed hereinabove, or they can be made non-resonant. The polarizers are spatially dependent in the sense different polarizers provide different polarizations to a light beam interacting therewith. In some embodiments of the present invention polarizers are arranged as an array such that two or more adjacent polarizers provide different polarizations. The polarizers can be configured for selectively polarizing a section of an image at the image plane or the Fourier plane.

Following are several representative examples for specific configurations and uses according to some embodiments of the present invention.

Figure 6A:
Figure 6A:
Figure 6A:
Figure 6A:
Figure 6B:
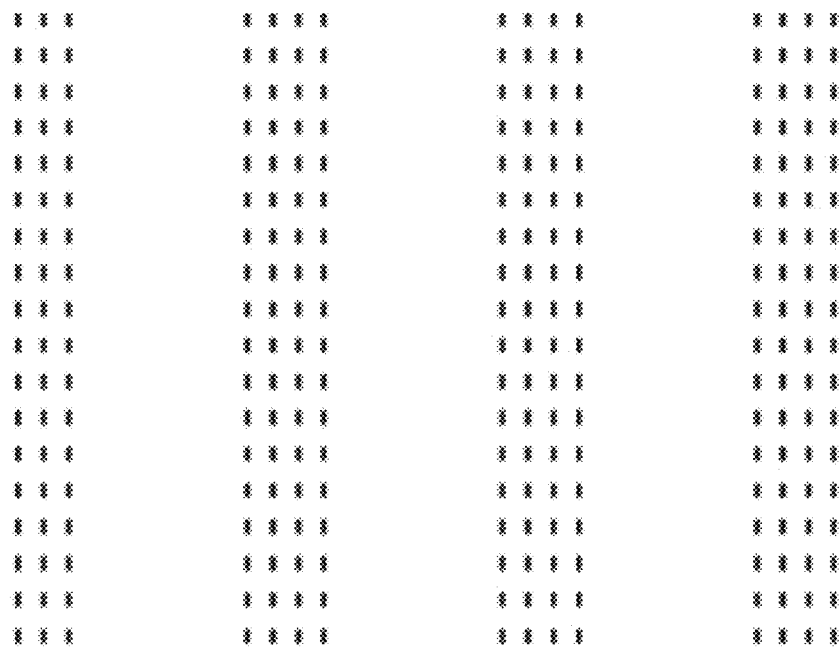

FIGS. 6A and 6B illustrate plasmonic diffraction gratings according to some embodiments of the present invention for X polarization (FIG. 6A) and Y polarization (FIG. 6B). The small lines represent nanoresonators, which in the present example serve as nanoantennas which are designed to resonate at certain optical frequencies. Light that has a frequency matching the resonance frequency of the antenna and that is polarized according to the direction of the antenna diffracts from the grating. Light which does not match the frequency or polarization of the antenna passes, substantially without interaction.

As used herein, "substantially without interaction," means that the propagation direction of a light ray (e.g., along the light beam central axis) is changed by less than $\Delta\theta$ while passing through the grating.

In some embodiments of the present invention $\Delta\theta$ is less than 5°, in some embodiments of the present invention $\Delta\theta$ is less than 4°, in some embodiments of the present invention $\Delta\theta$ is less than 3°, in some embodiments of the present invention $\Delta\theta$ is less than 2°, in some embodiments of the present invention $\Delta\theta$ is less than 1°, in some embodiments of the present invention $\Delta\theta$ is less than 0.5°, in some embodiments of the present invention $\Delta\theta$ is less than 0.1°, and in some embodiments of the present invention $\Delta\theta$ is 0.

The antennas in FIGS. 6A and 6B are optionally and preferably tuned to different lengths to resonate at different wavelengths.

Figure 6C:
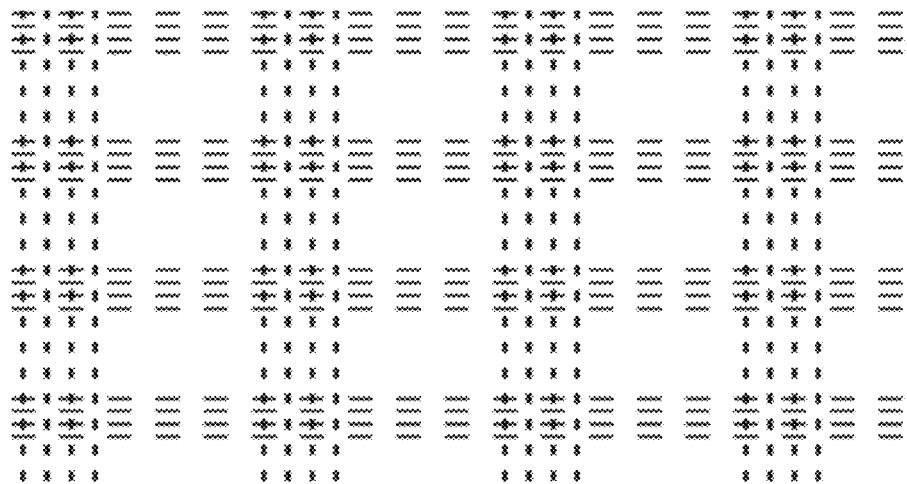

The gratings can be placed in an overlapping configuration with respect to the incoming light beam such that the light beam first interacts, e.g., with the grating shown in FIG. 6A and then interact, e.g., with the grating shown in FIG. 6B. Alternatively, the resonators of FIGS. 6A and 6B can be combined to form a single grating, as illustrated in FIG. 6C. In this embodiment, some resonators effect diffraction for both X polarized and Y polarized light, some resonators effect diffraction only for X polarized light (with no or minimal diffraction for Y polarized light), and some resonators effect diffraction only for Y polarized light (with no or minimal diffraction for X polarized light). Thus, light that is polarized along the X direction and has the X nanoantenna resonance frequency interacts only with the horizontal nanoantennas (substantially without interaction with the vertical nanoantennas), and light that is polarized along the Y axis and has the resonance frequency of the Y nanoantennas interacts only with the vertical nanoantennas (substantially without interaction with the horizontal nanoantennas). Light polarized, e.g., at 45° interacts with both the horizontal and vertical nanoantenna provided it had the correct frequencies. Such a configuration has multiple wavelength and polarization functionalities.

Figure 7:
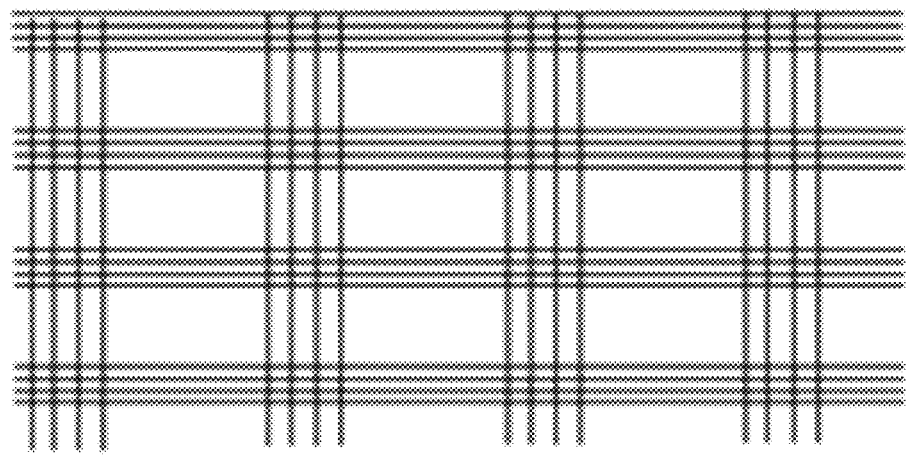

FIG. 7 is a schematic illustration of an array of polarizers in embodiment in which made non-resonant polarizers are employed. In the representative example, which is not to be considered as limiting, the non-resonant polarizers are embodied as continuous nanowires or nanotubes, each having a length of more than 1 microns, and which generally do not have specific plasmonic resonances. Thus, light that is polarized along the X direction interacts only with the horizontal polarizers (substantially without interaction with the vertical polarizers), and light that is polarized along the Y axis interacts only with the vertical polarizers (substantially without interaction with the horizontal polarizers). Light polarized, e.g., at 45° interacts with both the horizontal and vertical polarizers. Unlike the configuration shown in FIGS. 6A-6C, the configuration shown in FIG. 7 is generally not frequency-selective since the non-resonant polarizers serve as broad-band polarizers. Thus, the configuration illustrated in FIG. 7 provides spatially varying polarization functionality.

The optical system optionally and preferably can be used for implementing a 2 focal point lens system, or a lens system with a single focal point but with corrected chromatic aberrations at two or more different wavelengths, or used as a dual purpose beam shaping system.

A lens system according to some embodiments of the present invention can comprise two diffractive lenses, one for each polarization axis of the light. Each diffraction lens can be designed and constructed for a specific focal length and specific light wavelength. For example, a first diffractive lens can comprise elongated nanostructures with Y axis orientation (such as the nanostructures illustrated in FIG. 6B), and a second lens can comprise elongated nanostructures with X axis orientation (such as the nanostructures illustrated in FIG. 6B). The two lenses can be combined on the same substrate (e.g., glass), either on the same surface of the substrate or on an opposite surfaces of the substrate. When two elongated nanostructures share the same position, a cross shaped nanostructure (see FIG. 6C).

Figure 8A:
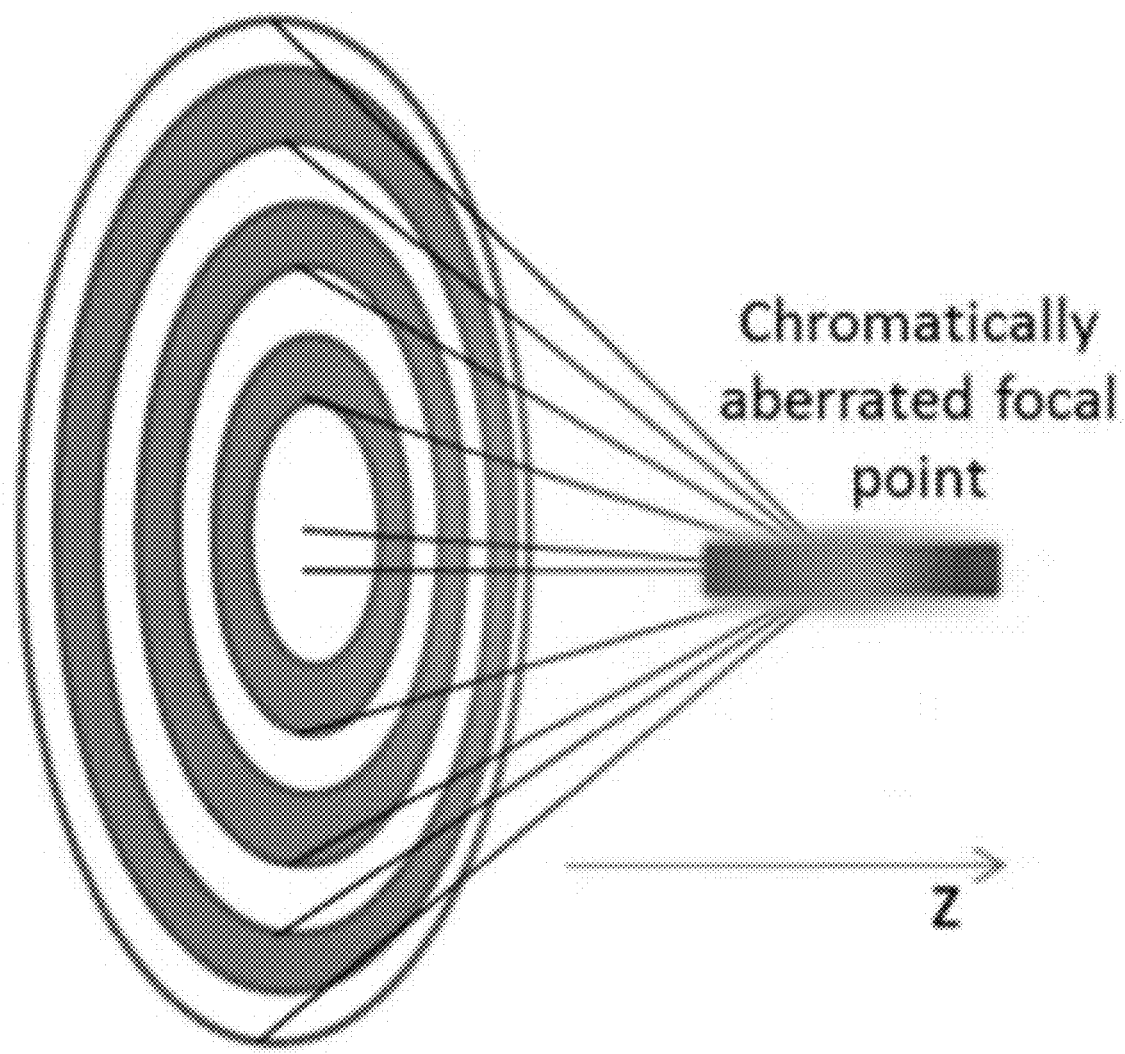

For purposes of better understanding some embodiments of the present invention, reference is made to optical functionality of a conventional FZP lens illustrated in FIG. 8A. As illustrated, the conventional FZP lens exhibits longitudinal chromatic aberration, wherein different spectral components of the light are brought to focus on different planes, which gives a color blurring effect.

Figure 8B:
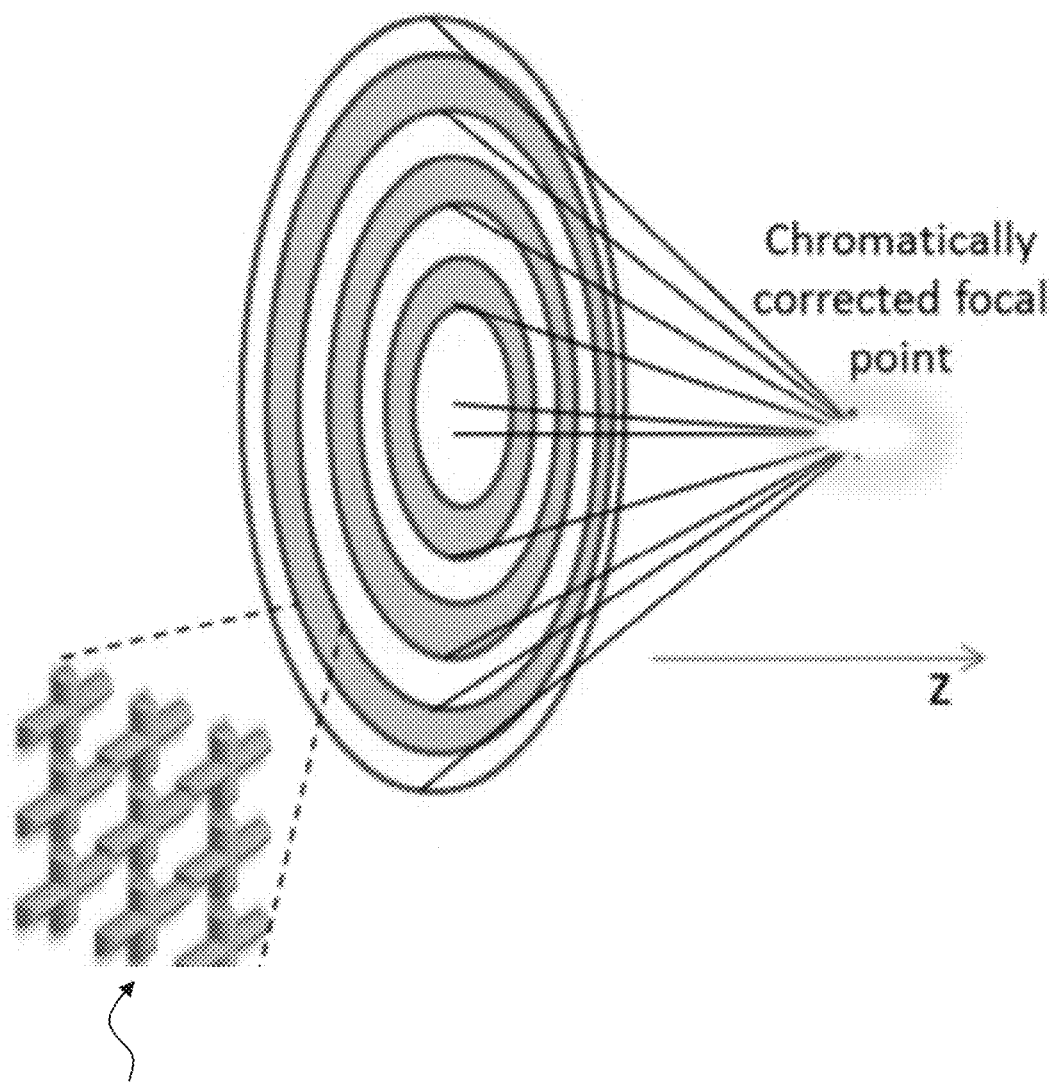
Figure 8C:
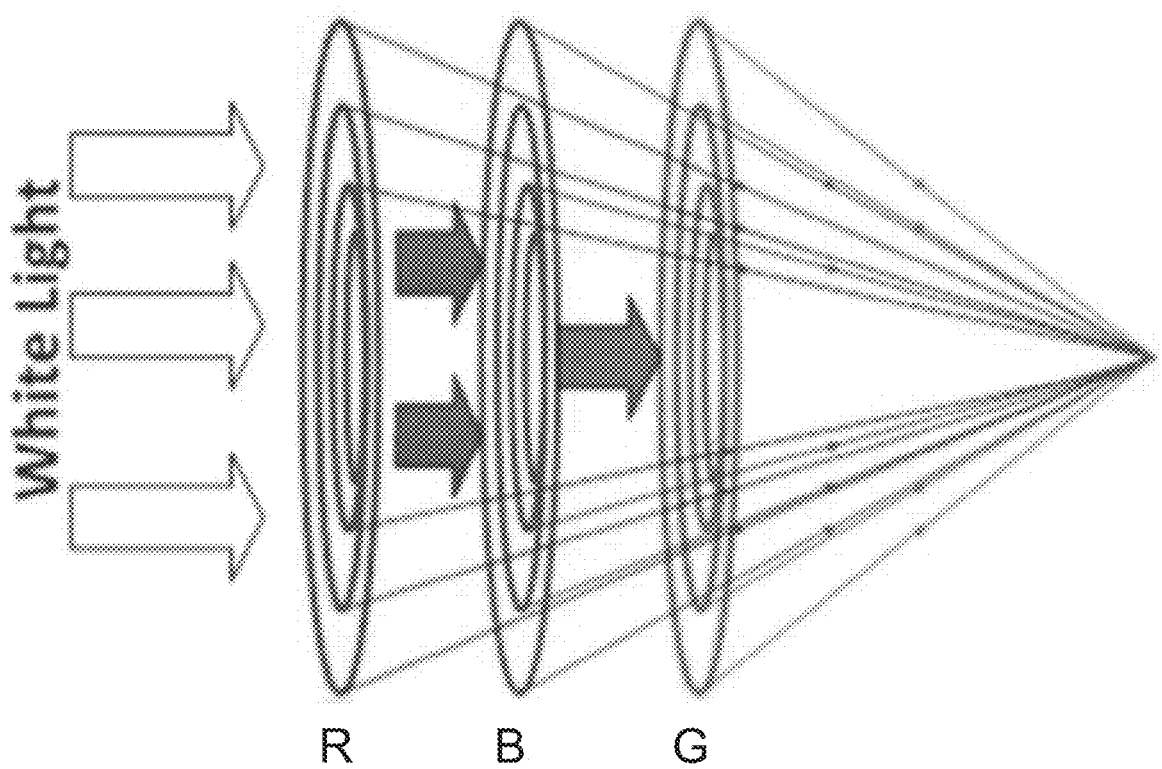

FIG. 8B illustrates an FZP lens which comprises, according to some embodiments of the present invention, an array 52 of resonators and which can selectively correct chromatic aberrations for different frequencies and polarizations. The resonators can be arranged along the rings of the FZP, or they can be provided on a different substrate positioned on the optical path of the light and spaced apart from the lens. As illustrated, the focal point is chromatically corrected. FIG. 8C illustrates an embodiment in which several different FZP lenses, each comprising, e.g., along its rings, a resonator array having resonant response to a different wavelength, are positioned serially on the same optical axis. In the illustrated example, which is not to be considered as limiting, three FZP lenses are illustrated. A first FZP lens, designated "R" comprising along its rings a resonator array having resonant response to a red wavelength, a second FZP lens, designated "B" comprising along its rings a resonator array having resonant response to a blue wavelength, and a third FZP lens, designated "G" comprising along its rings a resonator array having resonant response to a green wavelength. The typical distance between the first FZP lens (the "R" lens in the present example) and the last lens (the "G" lens in the present example) is from about 1 micron to about 5 microns.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Computer Simulations

A computer simulation of a system according to some embodiments of the present invention was executed in two stages. A first stage included simulation of the frequency response of nanoantennas. The simulation was performed using finite difference time domain method and was used to investigate several sizes of cross shaped antennas and wire type antennas. A second stage of the simulation was performed using beam propagation method to simulate the functionality of the diffractive elements design with respect to the light wavelength and the distance from the element.

FIG. 9 shows simulation results for transmission through an array of cross shape Aluminium nanoantennas with arm lengths ranging from 100 nm to 200 nm. All the other dimensions are fixed (width 40 nm, and heights 40 nm). The graph shows that the response of the antennas can be tuned over the visible spectral region. Other materials such as gold or silver can be used to tune the width of the resonance and get response for different spectral regimes.

FZP Lens Simulation

A computer simulation of a FZP lens was performed using a mathematical model of 2 binary zone plate lenses. A first zone plate lens was designed for 1 mm focal length for light with 450 nm wavelength, and a second zone plate lens was designed for 1 mm focal length for light with 620 nm wavelength. By using the nanoantennas the two different lenses were encoded on the same surface.

Mathematically, the transmission function of the zone plate was as follow:

$$U_1 = \frac{1}{2}\left(1 + \frac{2\pi}{\lambda}\cos\left(\frac{x^2+y^2}{2F}\right)\right)circ(R) \qquad \text{EQ. A.1}$$

For a binary diffractive lens a threshold of 0.5 was used. For $U_1$ larger than 0.5 light passes, and for $U_1$ lower than 0.5 light is blocked. The simulation used the Fresnel Transfer Function propagator. $U_2$ is the light intensity at a distance Z, and is substantially given by:

$$U_2 = \mathfrak{F}^{-1}\{\mathfrak{F}\{U_1(x,y)\}H(f_x,f_y)\} \qquad \text{EQ. A.2}$$

where $$H(f_x,f_y) = e^{jkz}\exp[-j\pi\lambda z(f_x^2+f_y^2)] \qquad \text{EQ. A.3}$$

$\mathfrak{F}\{U(x,y)\}$ represents a Fourier transform operation and $\mathfrak{F}^{-1}\{U(f_x,f_y)\}$ represents an inverse an inverse Fourier transform operation.

Calculations and simulations were performed on the functionality of an FZP lens which comprises nanoantennas. The calculation showed that the FZP lens of the present embodiments can focus several different wavelengths within the visible spectrum to a single point in space.

FIG. 10A shows the calculated chromatic aberrations of the focal point using a conventional FZP and FIG. 10B shows simulation results of focusing light at wavelength of 620 nm and wavelength of 450 nm through a conventional FZP which was designed to focus the light at 620 nm to 1 mm. As shown, light at 450 nm is focused to further away to about 1.4 mm. Thus, when imaging through such a lens only one of the wavelengths will be in focus at the image plane. FIG. 10C shows calculated results of the focusing properties of the FZP of the present embodiments, where the 450 nm light is polarized at 90° and 620 nm light polarized at 0°. The two wavelengths share the same position of the focal spot which means that chromatic aberrations were successfully corrected.

Airy Beam Simulation

A computer simulation of two optical systems having an array of resonators in accordance with some embodiments of the present invention was performed. A first simulation was directed to a DOE that diffracts one polarization of light without shaping the beam, and a second simulation was directed to a DOE that shape an input Gaussian beam into and Airy beam. The phase modulated grating was simulated and then the beam shape was calculated using standard Fourier optics methods. Specifically, the grating and incident beam were transformed to the frequency domain, where linear multiplication takes place. The result of this analysis show that when the beam is X polarized an accelerating Airy beam is generated, and when the beam is Y polarized a Gaussian beam diffracts out of the element.

FIG. 11A shows a Y polarized incident Gaussian beam (beam waist=20 μm) projected on a 0 phase grating (100 μm×100 μm), FIG. 11B shows the output optic modes at the far field demonstrating that these are separated Gaussian modes at the 0th, 1st and 2nd orders, and FIG. 11C shows an intensity profile along a cross section of the first order mode demonstrating a Gaussian profile.

FIG. 12A shows an X polarized incident Gaussian beam (beam waist=20 μm) projected onto the phased 100 μm×100 μm grating, FIG. 12B shows the output, demonstrating that the 0th and 1st orders Airy modes are visible, and FIG. 12C shows an intensity profile along a cross section of the first order mode demonstrating an Airy beam pattern.

The computer simulations performed according to some embodiments of the present invention demonstrate that the spatial distribution and shape of the nanoantennas can be selected to provide diffractive elements which respond differently to different wavelengths and different polarizations.

Polarization and Wavelength Encoding of Spatial Optical Frequencies

The present inventors found that placing elements made out of resonators or spatially varying polarizers at the optical Fourier plane of images can be used to perform polarization and wavelength encodings of optical images. FIG. 13 is a schematic illustration of an array of resonators that encodes low spatial frequencies to one polarization and high spatial frequencies to other polarizations. This operation can be performed at multiple wavelengths using layered or single layer of optical resonators with varying spatial arrangements.

Experimental Results

As a representative example, a diffractive lens system with dual wavelength response was manufactured according to some embodiments of the present invention. The lens system included a first array of resonators which were responsive to at a wavelength of 670 nm (red light) and a polarity of 90°, and a second array of resonators which were responsive to light at a wavelength of 480 nm (blue light) and a polarity of 0°. Both lenses provided focus at the same focal point.

The lens system was fabricated on an ITO coated glass substrate, and E-beam was used for the lithography process.

FIGS. 14A and 14B show scanning electron microscope (SEM) images of a small part of the fabricated FZP lens. FIG. 14B has a higher magnification and also includes the antennas dimensions. The SEM image shows the 3 type of antennas used in the model. Vertical antennas size 197 nm were responsive to the 670 nm wavelength lens (polarity 0), the horizontal antennas size 128 nm were responsive to the 480 nm wavelength lens (polarity 90), and the cross shaped antennas were positioned at locations at which there was an overlap between the two lenses.

FIGS. 15A-15C are images showing the full optical output of the fabricated diffractive lens. FIG. 15A is an SEM image of the lens, FIG. 15B is an image of the lens taken with polarized white light, at polarization of 90°, and FIG. 15C was taken with polarized white light, at polarization of 0°. In FIG. 15B the rings are blue colored because the nanoantennas polarized at 90° block the red color. In FIG. 15C the rings are red/orange colored because the antennas at polarity 0° block the blue color.

Experimental Setup

FIG. 16 is a schematic illustration of an experimental setup used for testing the fabricated FZP lens. A white light source was polarized and transmitted through the diffractive optical element. An objective lens was used to image the different z planes and to record the propagation of light after the FZP lens. Light at different places after the FZP lens was also coupled to a spectrometer to examine the spectral content.

Test Results

FIGS. 17A-17C show the frequency response of the FZP lens at different z planes with different input polarizations. Shown are the optical images of the lens under white light illumination, polarity of 0°, at z distances from the lens of 0 mm (FIG. 17A), 0.5 mm (FIG. 17B) and 1 mm (FIG. 17C). At 0 mm, the lens was observed as red/orange rings. At 1 mm, a very strong blue light was observed at the focal point, which is consistent with the computer simulations.

FIGS. 18A-18C show optical images of the lens under white light illumination, polarity 90°, at z distances from the lens of 0 mm (FIG. 18A), 0.5 mm (FIG. 18B) and 1 mm (FIG. 18C). At 0 mm, the lens was observed as blue rings. At 1 mm a strong red light was observed at the focal point, which is consistent with the computer simulations.

FIGS. 19A-19C shows the focal point, 1 mm away from the lens along the z axis, with different input polarizations. At the focal point, the input polarity of 0 (FIG. 19A) focuses the blue light, the input polarity of 90 (FIG. 19B) focuses the red light, and the input polarity of 45 (FIG. 19C) merges the blue and red lights and corrects the chromatic aberrations.

FIGS. 20A and 20B are images built from a sequence of images taken at different distances from the lens. The steps between each image are 0.05 mm. FIG. 20A corresponds to polarization of 90° and FIG. 20B corresponds to polarization of 0°. As shown, each polarization focuses a different color at 1 mm. Aluminium nanoantennas have a wide color response. Other metals, such as, but not limited to silver, can be used when more selective response is desired.

FIGS. 21A and 21B show the spectrum on the propagation axis as a function of distance from the diffractive lens. This provides a spectral presentation the effect which was shown in the previous color images. At the focal distance of 1 mm one polarization provides a strong light at wavelength of 650 nm and the other polarization provides a strong light at wavelength of 450 nm.

Dual Polarization Controlled Beam Shaper

Two dual beam shapers based on nanoresonators were produced. One for changing between Gaussian beams and Airy beams as described above with simulation results shown in FIGS. 11A-12C. The other dual beam shaper was designed to switch between Hermite Gaussian beam of the lowest order and Hermite Gaussian beam of the first order.

FIG. 22A-22D show white light transmission images through the dual polarization beam shapers at the two polarizations. FIGS. 22A and 22D respectively show the Y and X polarized transmission through the Airy/Gaussian beam shaper. As shown, at Y polarization the element is mostly a regular grating while at the X polarization the grating is an Airy diffraction grating. The blank spots are due to fabrication imperfections. FIGS. 22B and 22C describe the transmission through the 00/01 Hermite-Gaussian beam shaper. The Y polarized transmission shows that both upper and lower part of the grating are in phase and the X polarized transmission shows gratings which are 90 degrees out of phase. This produces the phase shift in the beam and the higher order beam.

FIGS. 23A-23D show results of diffraction through the dual polarization beam shapers for wavelength of 730 nm. The dual beam shaping functionality is clearly demonstrated.

The present examples demonstrated a method and system that can be used, for example, to correct chromatic aberrations or for optical components with multiple functionalities. The experimental data demonstrated an FZP lens which successfully corrected chromatic aberrations, and a dual purpose laser beam shaper.

Example 2

The present example demonstrates switchable coupling to plasmonic beams with arbitrary properties. Specifically, the present example demonstrates switchable coupling to SPP caustic curvatures, such as but not limited to self-accelerating bottle beams and implementing a dual foci lens (focus switches between 40 μm and 60m). Plasmonic beams were excited from free-space through a quasi 1-D arrangement of rod and cross shaped silver nanoantennas on top of a silver film. The nanoantennas acted as point sources that couple the incident beam to propagating surface plasmons. The arrangement of the nanoantennas sets the required phase for the plasmonic beam in the transverse direction. The strong polarization and wavelength selectivity of the nanoantennas allow encoding two different beam shapes on the same mask.

FIG. 24A illustrates the mask design and the experimental setup. The mask was composed of a 1-D chain of densely packed rod nanoantennas. The mask was illuminated from above with polarized light (=1024 nm) and the generated SPP beam was scanned with a near field probe. The polarization sensitivity allowed to switch the accelerated beam on or off with an on/off ratio greater than 50%. FIG. 24B shows the experimental result of the excitation of a bottle beam. FIGS. 24C and 24D show the experimental result of the dual lens, demonstrating the switching between 40 μm and 60 μm focal distances.

Example 3

The present example provides further demonstration for the ability of the method and system of the present embodiments to correct chromatic aberrations. The resonators used in the present example consisted of cross shaped and rod shaped optical nanoantennas. In the present example, the resonators are used to correct the chromatic aberrations of FZP at two different wavelengths. The FZP of this example is a combination of two independent FZPs. One FZP is designed to focus horizontally polarized light at wavelength of 460 nm to 1 mm away from the lens. This functionality is encoded on the horizontal polarization response of the resonators. Another FZP is designed to focus vertically polarized light at 650 nm to 1 mm away from the lens. This functionality is encoded on the vertical polarization response of the resonators.

Mathematically, the transmission function of the FZP was as follow:

$$U = \frac{1}{2}\left(1 + \text{sign}\left(\cos\left(\frac{2\pi}{\lambda^f} * \frac{x^2 + y^2}{2f}\right)\right)\right) \quad \text{EQ. A.4}$$

where $\lambda^f$ is the wavelength that is focused after length f and can be taken as the operation wavelength. In order to construct the FZP with corrected chromatic aberrations, two different lenses with transmission functions $U_V$ and $U_H$ were calculated with two different operation wavelengths. The vertical polarization dependent transmission function $T_V$ was described by:

$T_V(\lambda,x,y)=t_V(\lambda)$, when $U_V(x,y)=0$; and $T_V(\lambda,x,y)=1$, when $U_V(x,y)=1$     EQ. A. 5 where $t_V$ is the spectral transmission response for vertical polarization of the resonator at (x,y).

The horizontal polarization dependent transmission function $T_H$ was described by:

$T_V(\lambda,x,y)=t_H(\lambda)$, when $U_V(x,y)=0$; and $T_V(\lambda,x,y)=1$, when $U_V(x,y)=1$     EQ. A. 6 where $t_H$ is the spectral transmission response for vertical polarization of the resonator at (x,y).

The total transmission function was then calculated using EQ. 7.

This configuration divides the operation of the FZP to different spectral regimes and different polarizations as calculated and presented in FIG. 25A, which shows the focal distance as a function of the wavelength of an FZP designed according to some embodiments of the present invention to focus 650 nm and 460 nm light to 1 mm focal distance. In comparison to a conventional FZP (see, e.g., FIG. 8A) the distance to focus is now divided into two regimes. FIG. 25A shows how pairs of wavelengths now share the same focal length.

FIGS. 25B and 25C show simulation results of output beam propagation, demonstrating that light at 650 nm (FIG. 25B) and light at 460 nm (FIG. 25C) are focused to the same spot in space.

Finite-difference time-domain (FDTD) simulations of transmission through arrays of rod and cross aluminum (Al) resonator on glass were also performed. FIG. 26A shows the FDTD simulation setup. Cross-shaped aluminum resonators are placed on glass with periodic boundary conditions on the surface to simulate a two-dimensional array. In the present example, polarized broadband light was used and the transmission response at the far field was tested. FIG. 26B shows simulation results of transmission response for crosses with thickness of 40 nm, arm widths of 40 nm, one arm length fixed at 100 nm and other arm length modified between 100 nm to 200 nm.

Vertical rod resonators were designed to block light at 650 nm and horizontal rod resonators were designed to block light at 460 nm. In the places of overlap of the blocking regions of the two polarizations, cross resonators which were designed to operate at the corresponding wavelengths as the rod resonators of the same orientation. The samples were fabricated by standard electron beam lithography. The dimensions of the vertical resonators were 180 nm×40 nm, 40 nm thick and the pitch is 200 nm. The horizontal resonators were 100 nm×40 nm, 40 nm thick and the pitch is 280 nm. The cross shape resonators shared the same parameters.

FIG. 27 shows a scanning electron microscope (SEM) image of the fabricated FZP. The mixture of the three types of resonators can be seen in the inset. To examine the samples optically the setup of FIG. 16 was used. FIGS. 28A-28D show images of the operation of the fabricated FZP with incoherent polarized white light from a Xenon arc lamp. The top two images (FIGS. 28A and 28B) are optical images of the lens at the two polarizations. As shown, different polarizations are affected by different lenses. At vertical polarization the lens appears blue since it blocks light at the red part of the spectrum (designed for 650 nm wavelength) and at horizontal polarization the lens appear yellow-red due to blocking of light at the blue part of the spectrum (designed for 460 nm wavelength). The lens does not appear at a uniform color at this polarization due to red shift of the resonances of the fabricated rod shaped resonators compared to the cross shaped resonators. The bottom images (FIGS. 28C and 28D) show the focal spot 1 mm away from the lens demonstrating that the two different polarizations focus different colors.

In order to examine the propagation of light away from the lens the same method that was used to examine the 1D FZP was used.

FIGS. 29A and 29B are built from a sequence of images taken at different distances from the lens. The step between each of the image is 0.05 mm. As shown, light at two different colors is focused to the same spot in space and by that the chromatic aberrations are corrected at these wavelengths. The functionality of the FZP depends on the wavelength acceptance of the resonators. Since there is an operation bandwidth for the resonators, other wavelengths also respond. This is shown as the wavelengths that are focused away from 1 mm.

FIGS. 30A and 30B show spectral measurements (Andor Shamrock 303i) of the on axis light distribution after the lens for the horizontally polarized white light (FIG. 30A) and vertically polarized light (FIG. 30B). The white line marks the focal distance of 1 mm from the lens. With horizontally polarized white light, focusing of wavelengths about 460 nm was achieved, and with vertically polarized white light focusing of wavelengths around 650 nm light was achieved. FIG. 30C illustrates the normalized light intensity at the focal distance of 1 mm from the lens for both light polarizations. This graph shows that the FZP of the present embodiments focuses two different wavelengths to the same point in space, and can therefore fix chromatic aberration.

FIGS. 31A-31C show focusing measurements of the FZP lens with coherent light illumination. FIG. 31A shows images of the lens and focal spot at two different polarizations and two different laser wavelengths. On the left using vertically polarized light at 650 nm and on the right hand side using horizontally polarized light at 460 nm. FIG. 31B shows light propagation (wavelength of 460 nm) after the lens for horizontally polarized light. Two focal points were measured due to a mismatch in the transmission response of the horizontal rod shape antennas and the horizontal part of the cross shape antennas. FIG. 31C shows light propagation (wavelength of 650 nm) after the lens for vertically polarized light.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An optical system, comprising an array of nanoresonators, wherein said array of nanoresonators is spatially ordered to polarize or effect light polarization over a cross section of a light beam, or an image, for at least one wavelength, and wherein said array of nanoresonators is configured for selectively polarizing a section of said image at an image plane or a Fourier plane.

2. The system of claim 1, wherein said array of nanostructures is spatially ordered to polarize or effect light polarization over said cross section of said light beam, or said image, for any wavelength within a wavelength range spanning over at least 100 nm.

3. The system of claim 1, further comprising a refractive optical element, wherein said refractive optical element and said array are positioned on a same optical axis, and wherein said array of nanostructures is selected to effect a spatially varying polarization over said cross section of said light beam.

4. The system according to claim 1, wherein said array is positioned at or near a Fourier plane of said image.

5. The system according to claim 1, serving as a component in a system selected from the group consisting of: a lens system, a beam shaping system, an imaging system and an optical sensor system.

6. A method of controlling light, comprising directing a light beam or an image onto an optical system which comprises an array of nanoresonators, wherein said array of nanoresonators is spatially ordered to polarize or effect light polarization over a cross section of the light beam, or the image, for at least one wavelength, wherein said array of nanoresonators is configured for selectively polarizing a section of said image at an image plane or a Fourier plane.

7. The method of claim 6, being executed for at least one of reducing longitudinal chromatic aberrations, reducing transverse chromatic aberrations, reshaping a profile of said light, reflecting incident light, shaping a profile of a near field beam, switching a near field beam, hyper spectral imaging, spectroscopy, obtaining spatial spectral dependence of said sample or image, and filtering spatial frequencies of said image.

8. The method of claim 6, wherein said array of nanostructures is spatially ordered to polarize or effect light polarization over said cross section of said light beam, or said image, for any wavelength within a wavelength range spanning over at least 100 nm.

9. The method of claim 6, further comprising a refractive optical element, wherein said refractive optical element and said array are positioned on a same optical axis, and wherein said array of nanostructures is selected to effect a spatially varying polarization over said cross section of said light beam.

10. The method according to claim 6, wherein said array is positioned at or near a Fourier plane of said image.

11. An optical system, comprising a first optical element, a second optical element and a third optical element positioned serially on a same optical axis, wherein each optical element is a Fresnel Zone Plate comprising a resonator array having resonant response to a different wavelength.

12. The system of claim 11, wherein at least one of said resonator arrays comprises a plurality of nanostructures.

13. The system of claim 11, wherein at least one of said resonator arrays comprises a plurality of nanostructures that are spatially ordered to polarize or effect light polarization over a cross section of a light beam for any wavelength within a wavelength range spanning over at least 100 nm.

14. The system of claim 11, wherein at least one of said resonator arrays is configured for selectively polarizing a section of an image constituted by a light beam, at an image plane or a Fourier plane.

15. The system of claim 11, further comprising a refractive optical element positioned on said optical axis, and wherein at least one of said resonator arrays is selected to effect a spatially varying polarization over a cross section of a light beam.

16. The system according to claim 11, serving as a component in a system selected from the group consisting of: a lens system, a beam shaping system, and an optical sensor system.

17. An imaging system comprising the system according to claim 11.

18. An optical system, comprising an array of nanoresonators positioned at or near a Fourier plane of an image, wherein said array of nanoresonators is spatially ordered to polarize or effect light polarization over a cross section of said image, for at least one wavelength.

19. A method of controlling light, comprising directing an image onto an optical system which comprises an array of nanoresonators positioned at or near a Fourier plane of said image, wherein said array of nanoresonators is spatially ordered to polarize or effect light polarization over a cross section of said image, for at least one wavelength.

* * * * *